(12) United States Patent
Vaquero Caballero et al.

(10) Patent No.: US 12,476,850 B2
(45) Date of Patent: Nov. 18, 2025

(54) ASYMMETRIC PULSE-SHAPING IN DIGITAL COMMUNICATION SYSTEMS

(71) Applicant: Infinera Corporation, San Jose, CA (US)

(72) Inventors: Francisco Javier Vaquero Caballero, Valladolid (ES); Mehdi Torbatian, Ottawa (CA); Demin Yao, Ottawa (CA); Han Henry Sun, Ottawa (CA); Jonathan Buset, San Jose, CA (US); Kuang-Tsan Wu, Ontario (CA)

(73) Assignee: Infinera Corporation

( * ) Notice: Subject to any disclaimer, the term of this patent is extended or adjusted under 35 U.S.C. 154(b) by 626 days.

(21) Appl. No.: 17/973,243

(22) Filed: Oct. 25, 2022

(65) Prior Publication Data

US 2023/0125343 A1 Apr. 27, 2023

Related U.S. Application Data

(60) Provisional application No. 63/271,312, filed on Oct. 25, 2021.

(51) Int. Cl.
*H04L 25/03* (2006.01)
*H04B 10/61* (2013.01)

(52) U.S. Cl.
CPC ... *H04L 25/03834* (2013.01); *H04B 10/6164* (2013.01); *H04B 10/6165* (2013.01)

(58) Field of Classification Search
None
See application file for complete search history.

(56) References Cited

U.S. PATENT DOCUMENTS

| 2011/0176815 A1* | 7/2011 | Frankel | H04B 10/548 |
| | | | 398/208 |
| 2020/0295829 A1* | 9/2020 | Dawoud | H04L 27/2697 |
| 2020/0336285 A1* | 10/2020 | Sun | H03L 7/085 |

* cited by examiner

*Primary Examiner* — David W Lambert

(57) ABSTRACT

Methods, systems, and apparatus, including computer programs encoded on computer storage media, for performing asymmetric pulse-shaping filtering. In some implementations, a receiver comprises a detector circuit operable to receive optical signal data from an optical link. The receiver comprises a filter circuit, coupled to the detector circuit, operable to (i) filter the optical signal data according to an asymmetric filtering scheme and (ii) output the filtered optical signal data, wherein the asymmetric filtering scheme comprises utilizing a shaping filter with first criteria, the first criteria including one or more values greater than one or more values of second criteria utilized by a shaping filter at a transmitter, the transmitter communicating with the receiver.

20 Claims, 10 Drawing Sheets

ASYMMETRIC PULSE-SHAPING IN DIGITAL COMMUNICATION SYSTEMS

CROSS REFERENCE TO RELATED APPLICATION

This application claims priority from and the benefit of U.S. Provisional Patent Application No. 63/271,312, titled "Methods for Pulse-shaping in Digital Communication Systems" and filed on Oct. 25, 2021, which is incorporated herein by reference in its entirety.

TECHNICAL FIELD

This disclosure generally relates to optical communication systems and asymmetric pulse-shaping for digital subcarrier systems.

BACKGROUND

Optical networks can be used to communicate data using light signals. Some components in the optical networks can communicate the light signals using subcarriers. Technical challenges arrive when a receiving optical system component attempts to process a particular one of the received subcarriers. In some cases, noise and distortions in the channel can cause interference in the subcarrier signals, which can lead to potential errors in recovering the subcarrier signal data at the receiver.

SUMMARY

This disclosure relates to implementing asymmetric pulse-shaping filters at both the transmitter and receiver of a digital subcarrier communication system. Both pulse-shaping filters at the transmitter and receiver can be designed so that the digital subcarrier communication system meets various performance criteria, e.g., power requirements, frequency offset detection requirements, and jitter detection requirements. Generally, when signals, e.g., one or more digital subcarriers, are transmitted over a link, e.g., an optical fiber or wireless link, the link imparts noise or distortion on the transmitted data. For example, the link can impart distortion that causes intersymbol interference (ISI) between subsequent symbols of the transmitted data. When ISI occurs, a transmitted pulse spreads beyond its allotted time interval, which causes interference with neighboring pulses of the transmitted data. Typically, ISI can be caused by multipath propagation or the frequency response of a communication channel that causes proximate symbols to blur or blend together. When the receiver receives transmitted symbols that have been distorted due to ISI and other effects, the receiver may have difficulty in properly detecting, demodulating, and recovering the transmitted information from the now blurred transmitted symbols. Thus, the digital subcarrier communication system can take one or more actions to alleviate the effects of distortion caused by ISI and other noise components.

One such technique to aid in alleviating the noise effects imparted on transmitted pulses can include, for example, applying pulse-shaping to the transmitter and receiver in the digital subcarrier communication system. Specifically, pulse-shaping can be used to help minimize the effects of ISI. The transmitter can include a pulse-shaping filter that adjusts the characteristics of the pulse to be transmitted and the receiver can include a pulse-shaping filter that adjusts the characteristics of the transmitted pulse received at the receiver. In this manner, the transmitter and receiver can work collectively to minimize the noise distortion.

In some implementations, a raised cosine filter is symmetrically split between the transmitter and receiver. However, symmetric raised cosine filters may impact other performance aspects of the digital subcarrier communication system. Pulse-shaping filters can be deployed in an asymmetric fashion, such that a reduction in ISI can be achieved while meeting other various design/performance criteria.

As will be further described below, deploying asymmetric pulse-shaping across a digital subcarrier communication system enables various benefits. In particular, asymmetric pulse-shaping improves jitter performance of a clock recovery phase detector at the receiver. Jitter can be described as the time discrepancy between the time arrival of a pulse and its theoretical or expected arrival time at a receiver. When these times differ by a threshold amount, the system is said to exhibit jitter. Jitter can arise from a number of sources including, for example, inefficient components of the clock phase detectors, issues with voltage-controlled oscillators, circuit issues caused by thermal and loading effects, one or more Doppler shifts on the transmitted signals, and de-multiplexing issues due to higher data rates. Generally, digital communication systems exhibit some allowable amount of jitter.

However, should the amount of jitter exceed a budgeted or threshold amount, the transmitter and receiver can be out of time synchronization, which can potentially render the digital communication system inoperable, e.g., not able to properly detect and extract data from the transmitted subcarriers. For example, the analog-to-digital converters (ADCs) sample the received digital subcarriers according to a specific sample rate. If the system exhibits some jitter, than the ADCs may sample the received digital subcarriers according to incorrect sampling rates, such as sampling noise rather than sampling the subcarrier themselves.

As such, by reducing the amount of jitter of the digital subcarrier communication system, e.g., deploying the asymmetric pulse-shaping across a transmitter and corresponding receiver, the ADCs in the receiver can ensure they are sampling at the appropriate sampling rate. By employing the asymmetric pulse-shaping, the overall amount of jitter can be substantially reduced as the amount of intersymbol interference is reduced. A reduction in intersymbol interference can reduce the overall amount of jitter, which ensures the ADCs sample at the appropriate sampling rate. By sampling at the appropriate sampling rate, the transmitter can ensure the receiver can (i) properly receive the digital subcarriers and (ii) properly detect and extract the message from the received subcarriers. Otherwise, jitter may create unwanted sampling issues with the ADCs, and ultimately, the receiver itself.

Similarly, asymmetric pulse-shaping can improve the frequency offset estimation error with various filters, e.g., notch detection filter, at the receiver. In a system with a frequency error offsets, the voltage-controlled oscillators at the transmitter and receiver may be out of sync. The voltage-controlled oscillators can be tuned to output light having a wavelength or frequency relatively close to a selected subcarrier wavelength (or subcarrier frequency), to cause a beating between the local oscillator light and the selected subcarrier. However, a frequency offset error may occur when the carrier frequency of the selected subcarrier and the tuned frequency of the voltage-controlled oscillator are different or not in sync, causing detection issues. These frequency offset errors can include, for example, 100 MHz, 500 MHz, or another amount, to name some examples.

In some implementations, the receiver may utilize a notch filter to detect the frequency error offset. A notch filter can improve a receiver's frequency error offset detection by measuring the frequency notches or the frequency gaps between proximate subcarriers in a digital subcarrier communication system. Generally, in a digital subcarrier communication system, a transmitter can apply one or more pulse shaping functions to the subcarriers prior to their transmission. The pulse shaping functions can reduce one or more side lobes of a subcarrier, which ultimately softens or rounds the subcarriers edges in the frequency domain. In response to the receiver receiving the pulse shaped subcarriers, the notch filter analyzes the received subcarriers to identify whether a frequency error offset is present. However, the notch filter can generally improves its frequency error offset detection when the subcarrier's edges are sharper, i.e., the subcarrier's side lobes in the time domain are not substantially reduced. Thus, the digital subcarrier communication system can employ the asymmetric pulse shaping to improve the notch filter's detection of the frequency error offset.

Specifically, when asymmetric pulse shaping is employed, the transmitter's pulse shaping functions can spectrally shape each of the subcarriers to a lesser degree such the subcarrier's side lobes are not substantially suppressed, i.e., the subcarrier's edges in the frequency domain remain sharp. The receiver can receive these subcarriers and the notch filter can improve its detection of the frequency error offset by measuring the "notch" or region between subsequent subcarriers. In response, the receiver can apply the pulse shaping functions to a degree greater than the pulse shaping functions applied at the transmitter. As such, the resultant asymmetric pulse shaping across the transmitter and receiver ensures the notch filter can improve its frequency error offset detection.

In one general aspect, a receiver includes: a detector circuit operable to receive optical signal data from an optical link; and a filter circuit, coupled to the detector circuit, operable to (i) filter the optical signal data according to an asymmetric filtering scheme and (ii) output the filtered optical signal data, wherein the asymmetric filtering scheme comprises utilizing a shaping filter with first criteria, the first criteria including one or more values greater than one or more values of second criteria utilized by a shaping filter at a transmitter, the transmitter communicating with the receiver.

Other implementations of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other implementations can each optionally include one or more of the following features, alone or in combination. For example, one implementation includes all the following features in combination.

In some implementations, the filter circuit is configured to jointly perform the filtering with the transmitter that transmitted the optical signal data over the optical link.

In some implementations, the filter circuit comprises at least one of the root-raised cosine filter, a Gaussian filter, and a sinc filter.

In some implementations, the receiver further includes: a clock phase detector circuit coupled to the filter circuit, the clock phase detector circuit operable to (i) determine a clock timing associated with the optical signal data and (ii) adjust a sampling time of one or more analog-to-digital converters in the receiver according to the determined clock timing.

In some implementations, the clock phase detector circuit is coupled to an input of the filter circuit and is located prior to the filter circuit in the receiver.

In some implementations, the first criteria includes a p-value, and the p-value is a degree of freedom of the shaping filter at the receiver, and the p-value is selected to optimize a power distribution between the shaping filter at the receiver and the shaping filter used at the transmitter.

In some implementations, the filter circuit includes a notch detector circuit, and the notch detector circuit is operable to detect a frequency offset associated with the filtered optical signal data.

In some implementations, the optical signal data includes a plurality of subcarriers and a bandwidth of the plurality of subcarriers corresponds to a bandwidth of the optical link.

In one general aspect, a receiver includes: a detector circuit operable to receive optical signal data over an optical link; and a filter circuit operable to filter the optical signal data according to an asymmetric filtering scheme, wherein the filter circuit comprises a notch detector circuit and the notch detector circuit is configured to: detect a frequency offset associated with the filtered optical signal data; and adjust a frequency of an oscillator in the receiver according to the detected frequency offset.

In some implementations, the receiver further includes: a clock phase detector circuit coupled to the filter circuit, the clock phase detector circuit operable to (i) determine a clock timing associated with the optical signal data and (ii) adjust a sampling time of one or more analog-to-digital converters in the receiver according to the determined clock timing.

In some implementations, the clock phase detector circuit is coupled to an input of the filter circuit and is located prior to the filter circuit in the receiver.

In some implementations, the filter circuit is configured to jointly perform the filtering with a transmitter that transmitted the optical signal data over the optical link.

In some implementations, the asymmetric filtering scheme includes utilizing a shaping filter with first criteria, the first criteria including one or more values greater than one or more values of second criteria utilized by a shaping filter at a transmitter, the transmitter communicating with the receiver.

In some implementations, the first criteria includes a p-value, and the p-value is a degree of freedom of the shaping filter at the receiver, and the p-value is selected to optimize a power distribution between the shaping filter at the receiver and the shaping filter used at the transmitter, the receiver configured to communicate with the transmitter.

In some implementations, the shaping filter includes at least one of a root-raised cosine filter, a Gaussian filter, and a sinc filter.

In one general aspect, a receiver includes: a device for communicating with one or more other devices using subcarrier signals, the device including: one or more filter circuits configured to (i) filter data indicative of each subcarrier signal of the subcarrier signals according to an asymmetric filtering scheme, the asymmetric filtering scheme implemented based on a degree of freedom value, and (ii) output the filtered data indicative of the subcarrier signal.

In some implementations, the asymmetric filtering scheme includes utilizing a shaping filter with first criteria, the first criteria including one or more values greater than one or more values of second criteria utilized by a shaping filter at another device, the other device communicates with the device.

In some implementations, the asymmetric filtering scheme comprises utilizing a shaping filter with first criteria, the first criteria including one or more values less than one or more values of second criteria utilized by a shaping filter at another device, the other device communicates with the device.

In some implementations, the filter circuit comprises at least one of the root-raised cosine filter, a Gaussian filter, and a sinc filter.

In some implementations, the filter circuit is configured to jointly perform the filtering with the one or more other devices using the asymmetric filtering scheme over an optical link.

The subject matter described in this specification can be implemented in various implementations and may result in one or more of the following advantages. In some implementations, by employing asymmetric pulse-shaping across a transmitter and receiver of a digital subcarrier communication system, the receiver can improve its jitter performance detection at its clock recovery phase detector and its frequency offset estimation error. Specifically, the use of asymmetric pulse-shaping enables different characteristics to employed at the transmitter and receiver that enables improved detection of transmitted frequency error, reduces the amount of jitter, and significantly reduces ISI.

The details of one or more implementations of the subject matter of this specification are set forth in the accompanying drawings and the description below. Other aspects, features and advantages will become apparent from the description, the drawings, and the claims.

BRIEF DESCRIPTION OF THE DRAWINGS

Like reference numbers and designations in the various drawings indicate like elements.

DETAILED DESCRIPTION

In some implementations, pulse-shaping filters are typically used at the transmitter and receiver of a digital subcarrier communication system. Typically, pulse-shaping filters are implemented to avoid intersymbol interference (ISI) that may be imparted on the transmitted signals received by the receiver. One such way to alleviate the ISI is to utilize symmetrical pulse-shaping at both the transmitter and receiver of the digital subcarrier communication system. However, by engineering pulse-shaping filters that work in an asymmetrical fashion in the digital subcarrier communication system, other various performance metrics can be met, which include jitter performance and frequency error offset detection, while alleviating the effects of ISI.

Figure 1:
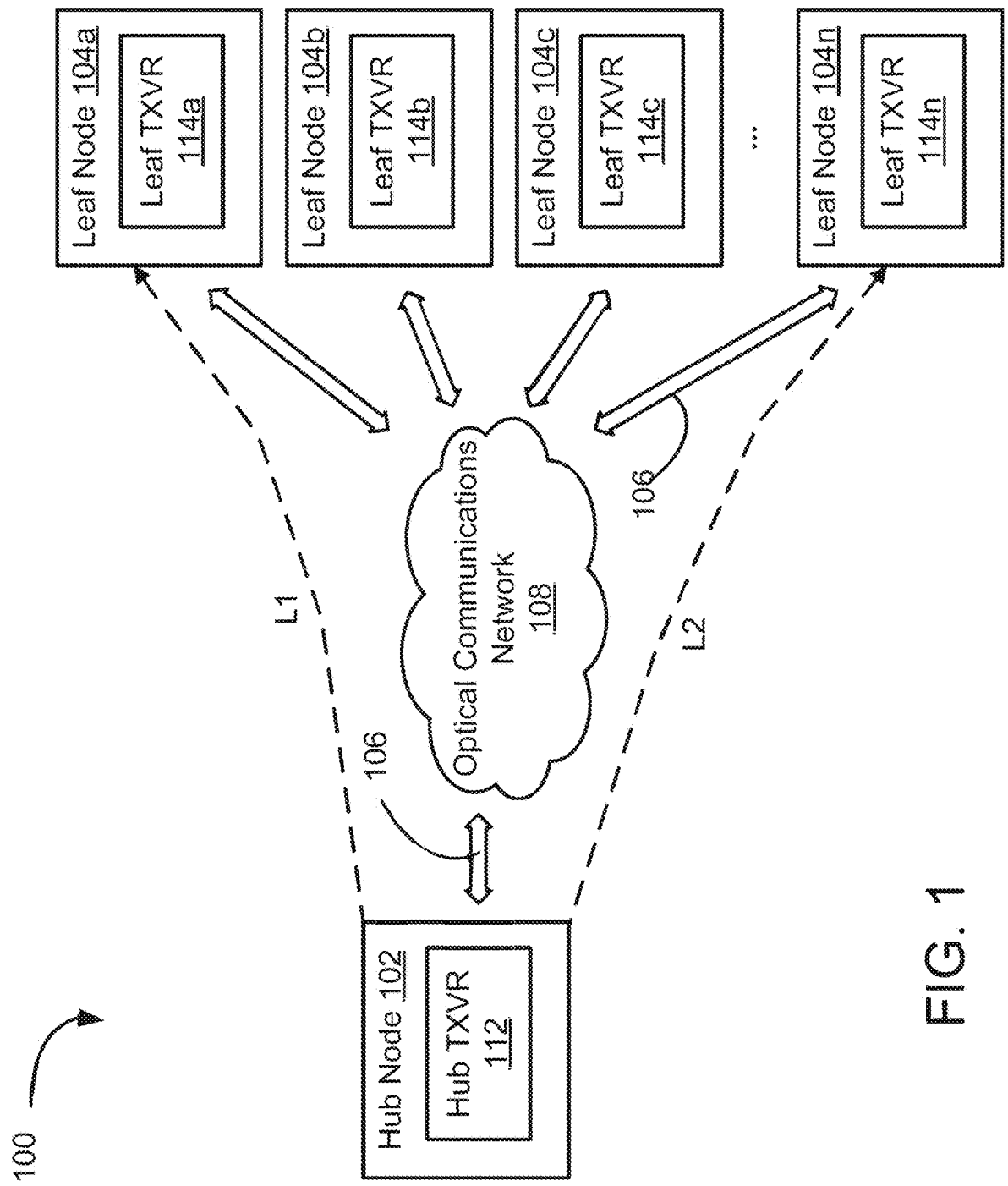
FIG. 1 is an illustration of an example communication system including a hub node, leaf nodes, and an optical communications network.

FIG. 1 depicts an example communication system 100. The communication system 100 can include wired and/or wireless communication systems, and, in some implementations, can be an optical communication network 108. The communication system 100 can be a point-to-point communication system or a point-to-multi-point communication system. For example, communication system 100 includes a hub node 102 and leaf nodes 104a-104n that are communicatively coupled to one another by optical links 106 in an optical communication network 108. In some implementations, the system 100 can be a part of one or more optical transport networks (OTNs) and/or can include one or more OTNs.

Each of the network nodes 102 and 104a-104n can include one or more respective computer devices (e.g., server computer, router, client computer, laptop, desktop). In some implementations, the network nodes can be configured such that each of the network nodes transmits data to and/or receives data from one or more other network nodes. As an example, the hub node 102 can be configured to transmit data to and/or receive data from one or more of the leaf nodes 104a-104n. For instance, hub node 102 can transmit data over an optical link L1 to leaf node 104a and transmit data over another optical link L2 to leaf node 104n. System 100 can include any number of network nodes greater than one (e.g., two, three, four, or more).

Each of the network nodes 102 and 104a-104n can include one or more transmitters and one or more receivers (which, in some implementations, can be combined as one or more transceivers) for transmitting and/or receiving data via the optical links 106 and the optical communications network 108. As an example, the hub node 102 can include a hub transceiver 112 that is coupled to one or more optical links 106. As another example, each of the leaf nodes 104a-104n can include a respective leaf transceiver 114a-114n that is coupled to one or more of the optical links 106. Each of the optical links 106 can be implemented using one or more lengths of optical fiber and/or equipment interconnecting the optical fiber (e.g., line system components). In some implementations, the optical links 106 can collectively define at least a portion of the optical communications network 108.

Figure 4:
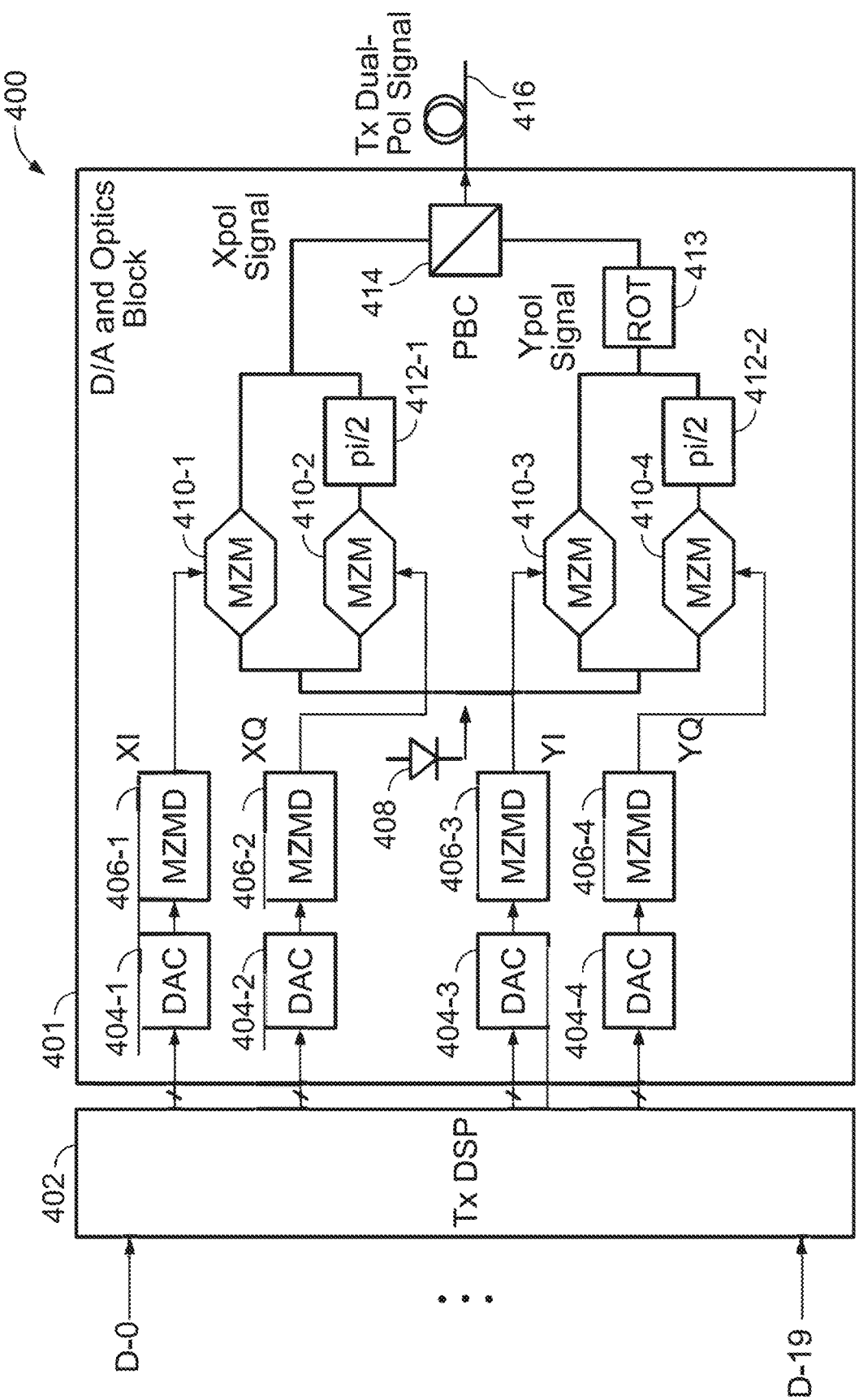
FIG. 4 is a diagram illustrating an example of components of an optical transmitter.

Example implementations of a transmitter and receiver are described with respect to FIGS. 4-7. FIG. 4 depicts an example transmitter 400 that includes a transmitter Digital Signal Processor DSP (Tx DSP) 402 and a Digital-to-Analog (D/A) and optics block 401. In some cases, transmitter 400 can be part of any one of transceivers 112, 114a-114n shown in FIG. 1. In the example shown in FIG. 4, the DSP 402 can receive one or more of the data streams D-0 to D-19. Specifically, each input to DSP 402 can be received as the inputs to FEC encoders 502 described below (see FIG. 5).

Each of the leaf nodes 104*a*, 104*b*, 104*c*, and 104*d* can output a number of subcarriers and provided to the DSP 402. Circuits, such as DSP 402, can similarly be included in a leaf node Tx DSP to adjust or control the number of subcarriers output therefrom.

Based on the number of subcarriers, e.g., D0 through D19, DSP 402 can supply a plurality of outputs to D/A and Optics Block 401 including digital-to-analog conversion (DAC) circuits 404-1 to 404-4, which convert digital signal received from DSP 402 into corresponding analog signals. D/A and Optics Block 401 also includes driver Mach-Zehnder Modulator Driver (MZMD) circuits 406-1 to 406-4 that receive the analog signals from DACs 404-1 to 404-4 and adjust the voltages or other characteristics thereof to provide drive signals to a corresponding one of modulators 410-1 to 410-4.

One or more or each of the modulators 410-1 to 410-4 can be a Mach-Zehnder modulator (MZM) that modulates the phase and/or amplitude of the light output from laser 408. The optical light signal output from laser 408, also included in block 401, is split such that a first portion of the light is supplied to a first MZM pairing, including MZMs 410-1 and 410-2, and a second portion of the light is supplied to a second MZM pairing, including MZMs 410-3 and 410-4. The first portion of the optical light signal is split further into third and fourth portions, such that the third portion is modulated by MZM 410-1 to provide an in-phase (I) component of an X (or TE) polarization component of a modulated optical signal, and the fourth portion is modulated by MZM 410-2 and fed to phase shifter 412-1 to shift the phase of such light by 90 degrees in order to provide a quadrature (Q) component of the X polarization component of the modulated optical signal. Similarly, the second portion of the optical light signal is further split into fifth and sixth portions, such that the fifth portion is modulated by MZM 410-3 to provide an I component of a Y (or TM) polarization component of the modulated optical signal, and the sixth portion is modulated by MZM 410-4 and fed to phase shifter 412-2 to shift the phase of such light by 90 degrees to provide a Q component of the Y polarization component of the modulated optical signal.

The optical outputs of MZM 410-1 and phase shifter 412-1 are combined to provide an X polarized optical signal including I and Q components and are fed to a polarization beam combiner (PBC) 414. In addition, the outputs of MZM 410-3 and phase shifter 412-2 are combined to provide an optical signal that is fed to polarization rotator 413 that rotates the polarization of such optical signal to provide a modulated optical signal having a Y (or TM) polarization. The Y polarized modulated optical signal also is provided to PBC 414, which combines the X and Y polarized modulated optical signals to provide a polarization multiplexed ("dual-pol") modulated optical signal onto optical fiber 416, for example, which can be included as a segment of optical fiber in an optical communication path.

While FIG. 4 shows transmitter 400 as including a particular number and arrangement of components, in some implementations, transmitter 400 can include additional components, fewer components, different components, or differently arranged components. The number of DACs 404, MZMD 406 circuits, and/or MZM circuits 410 can be selected to implement a transmitter 400 that is capable of receiving a polarization multiplexed signal. In some instances, one of the components illustrated in FIG. 4 can carry out a function described herein as being carry out by another one of the components illustrated in FIG. 4.

Figure 5:
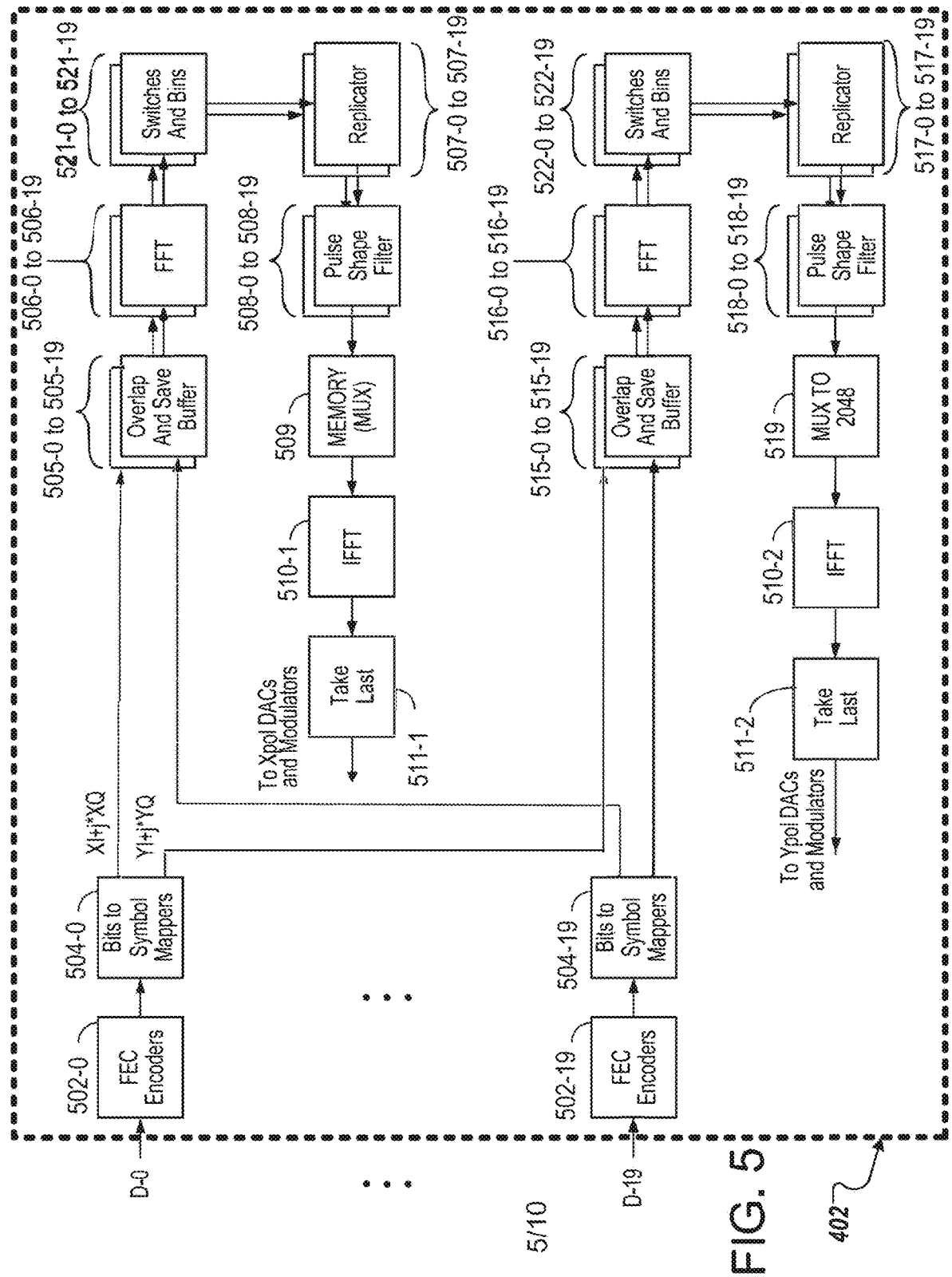
FIG. 5 is a diagram illustrating an example of components of a digital signal processor of the transmitter shown in FIG. 4.

FIG. 5 shows an example of Tx DSP 402 in greater detail. Tx DSP 402 can include FEC encoders 502-0 to 502-19, each of which can receive data streams D-0 to D-19 that include subcarriers SC0 to SC19, which each have X and Y polarization components and I and Q components. Each subcarrier SC0 to SC19 can be associated with or corresponds to a respective one of the data streams D0 to D19. For example, DSP 402 provides outputs that result in optical subcarriers SC0 through SC19 which carry information indicative of a respective one of data streams D0 through D19.

FEC encoders 502-0 to 502-19 can perform forward error correction coding on a corresponding one of the data streams, such as, by adding parity bits to the received data. In addition, FEC encoders 502-0 to 502-19 can interleave data.

Each of FEC encoders 502-0 to 502-19 provides an output to a corresponding one of a plurality of bits-to-symbol circuits, 504-0 to 504-19 (collectively referred to herein as "804"). Each of bits-to-symbol mapping circuits (mappers) 504 can map the m encoded bits to symbols (where m is a whole number greater than or equal to 2) on a complex plane.

In some implementations, the bits-to-symbol mappers 504 can map four bits (m=4) to an X symbol+Y symbol in a dual-polarization QPSK constellation. Each of bits-to-symbol mappers 504 provide first symbols, having the complex representation XI+j*XQ, associated with a respective one of the data streams, such as D-0, to DSP 402. Data indicative of such first symbols is carried by the X polarization component of each subcarrier SC0-SC19.

Each of bits-to-symbol mappers 504 further can provide second symbols having the complex representation YI+j*YQ, also associated with a corresponding output of data streams D0-D9. Data indicative of such second symbols, however, is carried by the Y polarization component of each of subcarriers SC-0 to SC-19.

Such mapping, as performed by mappers 504-0 to 504-19 provides, in one example, a particular modulation format for each subcarrier. That is, such circuit can configure a mapping for all the optical subcarrier that is indicative of a binary phase shift keying (BPSK) modulation format, a quadrature phase shift keying (QPSK) modulation format, or an m-quadrature amplitude modulation (QAM), where m is a positive integer, e.g., 4, 8, 16, or 64) format. In another example, one or more of the optical subcarriers can have a modulation format that is different than the modulation format of other optical subcarriers. That is, one of the optical subcarriers can have a QPSK modulation format and another optical subcarrier can have a different modulation format, such as 8-QAM or 16-QAM. In another example, one of the optical subcarriers has an 8-QAM modulation format and another optical subcarrier has a 16 QAM modulation format. Accordingly, although all the optical subcarriers can carry data at the same data and or baud rate, consistent with an aspect of the present disclosure one or more of the optical subcarriers can carry data at a different data or baud rate than one or more of the other optical subcarriers. Baud rate corresponds to one over the symbol duration. Moreover, modulation formats, baud rates and data rates can be changed over time depending on, for example, capacity requirements. Adjusting such parameters can be achieved, for example, by applying appropriate signals to mappers 504 based on control information or data described herein and the communication of such data as further disclosed herein between primary and secondary nodes.

As further shown in FIG. 5, each of the first symbols output from each of bits-to-symbol mappers 504 is supplied to a respective one of first overlap and save buffers 505-0 to 505-19 (collectively referred to herein as overlap and save buffers 505) that can buffer, for example, 256 symbols. Each of overlap and save buffers 505 can receive, for example, 128 of the first symbols or another number of such symbols at a time from a corresponding one of bits-to-symbol mappers 504. Thus, overlap and save buffers 505 can combine, for example, 128 new symbols from bits to symbol circuits 504, with the previous 128 symbols received from bits to symbol circuits 504.

Each overlap and save buffer 505 can supply an output, which is in the time domain, to a corresponding one of fast Fourier Transform (FFT) circuits 506-0 to 506-19 (collectively referred to as "FFTs 506"). In one example, the output includes 256 symbols or another number of symbols. Each of FFTs 506 can convert the received symbols to the frequency domain using or based on, for example, a fast Fourier transform. Each of FFTs 506 can provide the frequency domain data to bins and switches blocks 521-0 to 521-19. Bins and switches blocks 521 can include, for example, memories or registers, also referred to as frequency bins (FB) or points, that store frequency components associated with each subcarrier SC.

Each switch SW can selectively supply either frequency domain data output from one of FFT circuits 506-0 to 506-19 or a predetermined value, such as 0. In order to block or eliminate transmission of a particular subcarrier, the switches SW associated with the group of frequency bins FB associated with that subcarrier are configured to supply the zero value to corresponding frequency bins. Replicator components 507 as well as other components and circuits in DSP 402 can further process the zero (0) values to provide drive signals to modulators 410, such that subcarrier $SC_0$ is omitted from the optical output from the modulators.

On the other hand, some switches SW' (not shown) can be configured to supply the outputs of FFTs 506, i.e., frequency domain data FD, to corresponding frequency bins FB. Further processing of the contents of frequency bins FB by replicator components 507 and other circuits in DSP 402 can result in drive signals supplied to modulators 410, whereby, based on such drive signals, optical subcarriers are generated that correspond to the frequency bin groupings associated with that subcarrier.

Each of replicator components or circuits 507-0 to 507-19 can replicate the contents of the frequency bins FB and store such contents (e.g., for T/2 based filtering of the subcarrier) in a respective one of the plurality of replicator components. Such replication can increase the sample rate. In addition, replicator components or circuits 507-0 to 507-19 can arrange or align the contents of the frequency bins to fall within the bandwidths associated with pulse-shape filter circuits 508-0 to 508-19 described below.

Each of pulse-shape filter circuits 508-0 to 508-19 can apply a pulse-shaping filter to the data stored in the frequency bins of a respective one of the plurality of replicator components or circuits 507-0 to 507-19 to thereby provide a respective one of a plurality of filtered outputs, which are multiplexed and subject to an inverse FFT, as described below. Pulse-shape filter circuits 508-1 to 508-19 calculate the transitions between the symbols and the desired subcarrier spectrum so that the subcarriers can be packed together spectrally for transmission, e.g., with a close frequency separation. Pulse-shape filter circuits 508-0 to 508-19 also can be used to introduce timing skew between the subcarriers to correct for timing skew induced by links between nodes in the transmitter 400, for example. In some cases, the pulse-shape filter circuits 508-0 to 508-19 can be configured to spectrally shape the subcarriers according to an asymmetric distribution scheme. This will be further described below. Multiplexer component 509, which can include a multiplexer circuit or memory, can receive the filtered outputs from pulse-shape filter circuits 508-0 to 508-19, and multiplex or combine such outputs together to form an element vector.

Next, IFFT circuit or component 510-1 can receive the element vector and provide a corresponding time domain signal or data based on an inverse fast Fourier transform (IFFT). In one example, the time domain signal can have a rate of 64 GSample/s. Take last buffer or memory circuit 511-1, for example, can select the last 1024 samples, or another number of samples, from an output of IFFT component or circuit 510-1 and supply the samples to DACs 404-1 and 404-2 (see FIG. 4) at 64 GSample/s, for example. As noted above, DAC 404-1 is associated with the in-phase (I) component of the X pol signal, and DAC 404-2 is associated with the quadrature (Q) component of the X pol signal. Accordingly, consistent with the complex representation XI+jXQ, DAC 404-1 receives values associated with XI and DAC 404-2 receives values associated with jXQ. As indicated by FIG. 4, based on these inputs, DACs 404-1 and 404-2 can provide analog outputs to MZMD 406-1 and MZMD 406-2, respectively, as discussed above.

As further shown in FIG. 5, each of bits-to-symbol mapping circuits (mappers) 504-0 to 504-19 can output a corresponding one of symbols indicative of data carried by the Y polarization component of the polarization multiplexed modulated optical signal output on fiber 116. As further noted above, these symbols can have the complex representation YI+j*YQ. Each such symbol can be processed by a respective one of overlap and save buffers 515-0 to 515-19, a respective one of FFT circuits 516-0 to 516-19, a respective one of replicator components or circuits 517-0 to 517-19, pulse-shape filter circuits 518-0 to 518-19, multiplexer or memory 519, IFFT 510-2, and take last buffer or memory circuit 511-2, to provide processed symbols having the representation YI+j*YQ in a manner similar to or the same as that discussed above in generating processed symbols XI+j*XQ output from take last circuit 511-1. In addition, symbol components YI and YQ are provided to DACs 404-3 and 404-4 (FIG. 4), respectively. Based on these inputs, DACs 404-3 and 404-4 can provide analog outputs to MZMD 406-3 and MZMD 406-4, respectively, as discussed above.

While FIG. 5 shows DSP 402 as including a particular number and arrangement of functional components, in some implementations, DSP 402 can include additional functional components, fewer functional components, different functional components, or differently arranged functional components. In addition, the number of overlap and save buffers, FFTs, replicator circuits, and pulse-shape filters associated with the X component can be equal to the number of switch outputs, and the number of such circuits associated with the Y component can also be equal to the number of switch outputs. However, in other examples, the number of switch outputs can be different from the number of these circuits.

As noted above, based on the outputs of MZMDs 406-1 to 406-4, a plurality of optical subcarriers $SC_0$ to $SC_{19}$ can be output onto communication channel, such as an optical fiber 416 (FIG. 4).

Figure 6:
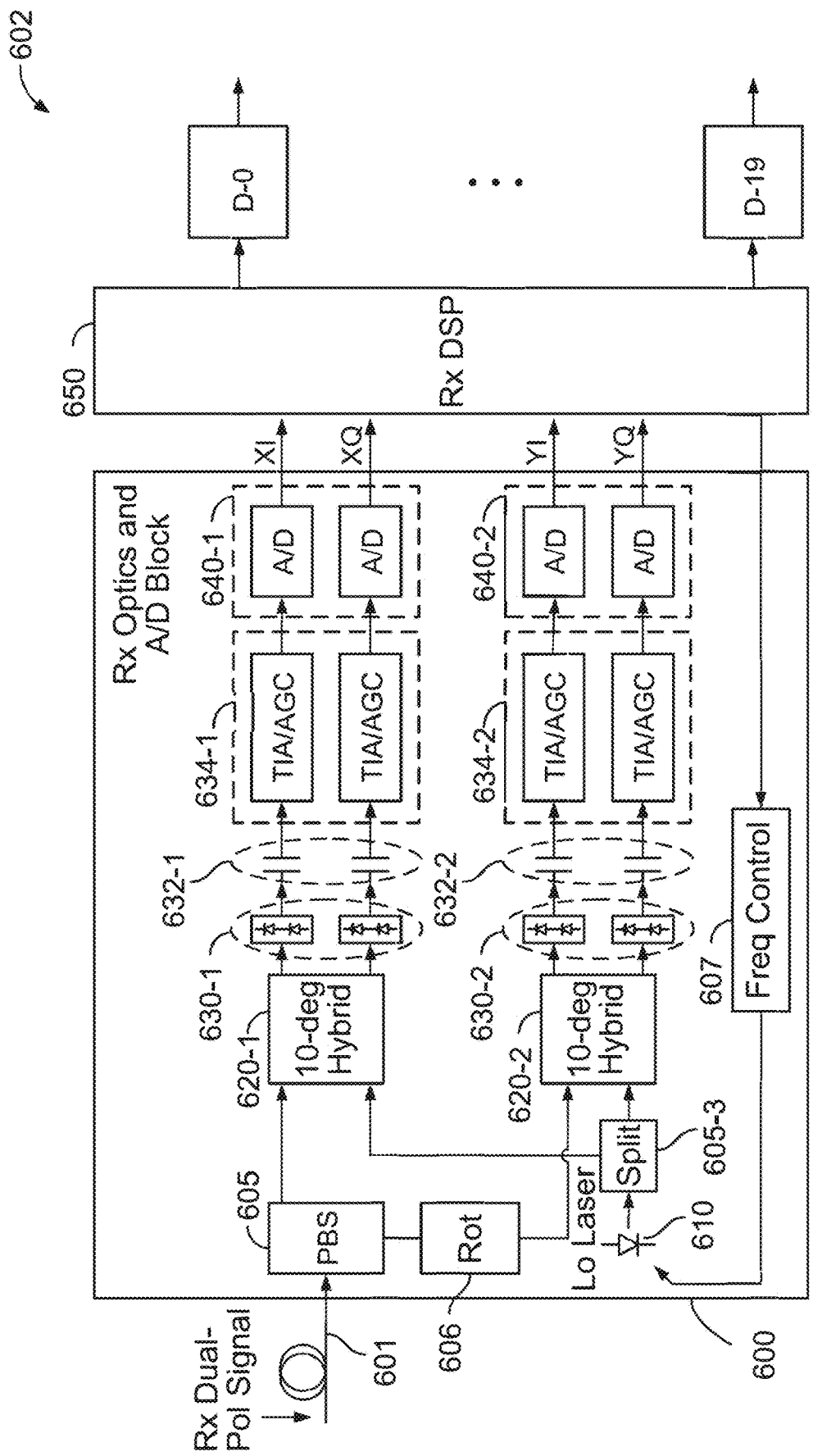
FIG. 6 is a block diagram illustrating components of an example receiver.

FIG. 6 depicts an example of a receiver (Rx) such as receiver 602 that includes an Rx optics and A/D block 600 and Rx DSP 650 to receive signals transmitted over optical fiber 416 and to perform coherent detection. In some cases, receiver 602 can be part of any one of transceivers 112, 114a-114n shown in FIG. 1.

The Rx optics and A/D block 600 can include a polarization splitter (PBS) 605 with first and second outputs, a splitter 605-3, a local oscillator (LO) laser 610, 10 degree optical hybrid circuits or mixers 620-1 and 620-2 (referred to generally as hybrid mixers 620 and individually as hybrid mixer 620), detectors 630-1 and 630-2 (referred to generally as detectors 630 and individually as detector 630, each including either a single photodiode or balanced photodiode), alternating current (AC) coupling capacitors 632-1 and 632-2, transimpedance amplifiers/automatic gain control circuits transimpedance/automatic gain control (TIA/AGC) 634-1 and 634-2, analog-to-digital converters (ADCs) 640-1 and 640-2 (referred to generally as ADCs 640 and individually as ADC 640).

Polarization beam splitter (PBS) 605 can include a polarization splitter that receives an input polarization multiplexed optical signal including optical subcarriers $SC_0$ to $SC_{19}$ supplied by optical fiber link 601, which can be, for example, an optical fiber segment as part of the optical communication network 108 or optical fiber 416. PBS 605 can split the incoming optical signal into the two X and Y orthogonal polarization components. The Y component can be supplied to a polarization rotator 606 that rotates the polarization of the Y component. Hybrid mixers 620 can receive and combine the X and rotated Y polarization components with light from local oscillator laser 610, which, in one example, is a tunable laser. For example, hybrid mixer 620-1 can combine a first polarization signal (e.g., the component of the incoming optical signal having a first or X (TE) polarization output from a first PBS port with light from local oscillator 610, and hybrid mixer 620-2 can combine the rotated polarization signal (e.g., the component of the incoming optical signal having a second or Y (TM) polarization output from a second PBS port) with the light from local oscillator 610. In one example, polarization rotator 610 can be provided at the PBS output to rotate the Y component polarization.

Detectors 630 can detect mixing products output from the optical hybrid mixers 620, to form corresponding voltage signals, which are subject to AC coupling by capacitors 632-1 and 632-1, as well as amplification and gain control by TIA/AGCs 634-1 and 634-2. The outputs of TIA/AGCs 634-1 and 634-2 and ADCs 640 can convert the voltage signals to digital samples. For example, two detectors (e.g., photodiodes) 630-1 can detect the X polarization signals to form the corresponding voltage signals, and a corresponding two ADCs 640-1 can convert the voltage signals to digital samples for the first polarization signals after amplification, gain control and AC coupling. Similarly, two detectors 630-2 can detect the rotated Y polarization signals to form the corresponding voltage signals, and a corresponding two ADCs 640-2 can convert the voltage signals to digital samples for the second polarization signals after amplification, gain control and AC coupling. Rx DSP 650 can process the digital samples associated with the X and Y polarization components to output data associated with one or more subcarriers within a group of subcarriers.

While FIG. 6 shows receiver 602 as including a particular number and arrangement of components, in some implementations, receiver 602 can include additional components, fewer components, different components, or differently arranged components. The number of detectors 630 and/or ADCs 640 can be selected to implement a receiver 602 that is capable of receiving a polarization multiplexed signal. In some instances, one of the components illustrated in FIG. 6 can carry out a function described herein as being carry out by another one of the components illustrated in FIG. 6.

Consistent with the present disclosure, in order to select a particular subcarrier or group of subcarriers at a secondary node 112, local oscillator 610 can be tuned to output light having a wavelength or frequency relatively close to the selected subcarrier wavelength(s) to thereby cause a beating between the local oscillator light and the selected subcarrier(s). Such beating will either not occur or will be significantly attenuated for the other non-selected subcarriers so that data carried by the selected subcarrier(s) is detected and processed by Rx DSP 650.

The local oscillator frequency can be tuned, for example, by changing the temperature of the local oscillator laser 610 to realize corresponding shifts in the bandwidth to encompass a different group of subcarriers than were detected prior to such bandwidth shift. The temperature of the local oscillator laser 610 can be controlled with a thin film heater. Alternatively, the local oscillator laser can be frequency tuned by controlling the current supplied to the laser 610. The local oscillator laser 610 can be a semiconductor laser, such as a distributed feedback laser or a distributed Bragg reflector laser. In some examples, the local oscillator frequency can be tuned by a frequency control 607 in the Rx Optics and A/D block 600. Specifically, the frequency control 607 can receive data from a pulse shape filter in the Rx DSP 650, such as one of the pulse shape filters 729-0 to 729-19. The data can indicate to the frequency control 607 the new tunable frequency to tune to the frequency of the local oscillator laser 610. In response, the frequency control 607 can tune or adjust the frequency of the local oscillator laser 610 according to the data provided by one or more of the pulse shape filters in the Rx DSP 650. The data can indicate, for example, a frequency offset for adjusting a frequency of the laser 610 for subsequent subcarrier signals.

As further shown in FIG. 6, the Rx DSP 650 can output the data detected from the received subcarriers, e.g., D-0 through D-19. Accordingly, for example, if data carried by a number of subcarriers is intended to be output at a particular leaf node 104a, 104b, 104c, 104d, the Rx DSP 650 at each particular leaf node can supply the desired data for further processing.

Figure 7:
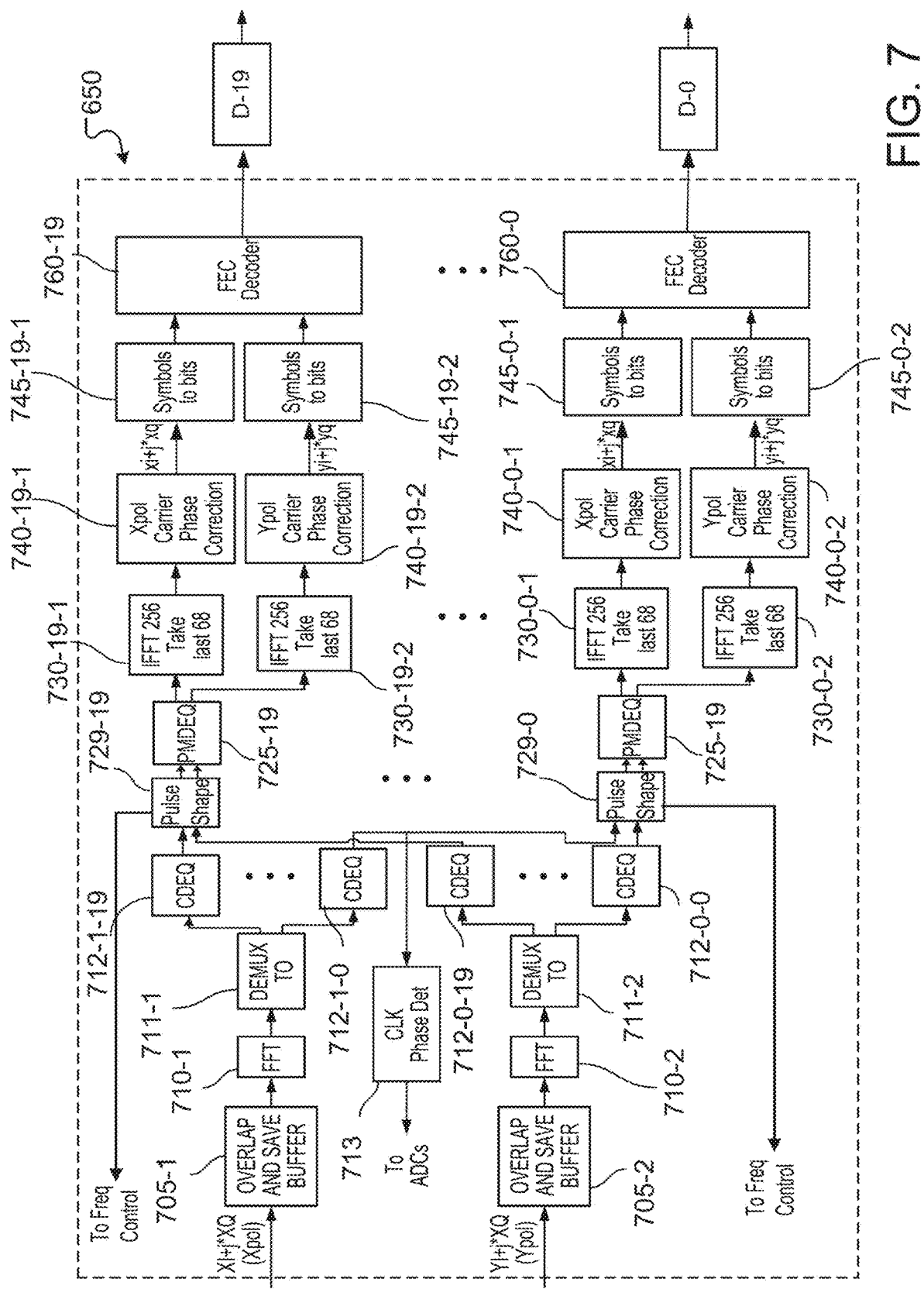
FIG. 7 is a block diagram illustrating an example digital signal processor of the receiver shown in FIG. 6.

FIG. 7 illustrates exemplary components of the Rx DSP 650. As noted above, analog-to-digital (A/D) circuits 640-1 and 640-2 (FIG. 6) output digital samples corresponding to the analog inputs supplied thereto. In one example, the samples can be supplied by each A/D circuit at a rate of 64 GSamples/s. The digital samples may correspond to symbols carried by the X polarization of the optical subcarriers and can be represented by the complex number XI+jXQ. The digital samples can be provided to overlap and save buffer 705-1, as shown in FIG. 7. FFT component or circuit 710-1 can receive the 2048 vector elements from the overlap and save buffer 705-1 and convert the vector elements to the frequency domain using, for example, a fast Fourier transform (FFT). The FFT component 710-1 can convert the 2048 vector elements to 2048 frequency components, each of which can be stored in a register or "bin" or other memory, as a result of carrying out the FFT.

The frequency components can be demultiplexed by demultiplexer 711-1, and groups of such components can be supplied to a respective one of chromatic dispersion equalizer circuits (CDEQ) 712-1-0 to 712-1-19, each of which can include a finite impulse response (FIR) filter that corrects, offsets or reduces the effects of, or errors associated with, chromatic dispersion of the transmitted optical subcarriers. Each of CDEQ circuits 712-1-0 to 712-1-19 supplies an output to a corresponding pulse shape filter circuit 729-0 to 729-19 (which individually or collectively can be referred to as 729).

The Rx DSP 650 can include multiple Rx Pulse-shape filter circuits 729-0 through 729-19. In some implementations, the Rx Pulse-shape filter 729-0 can be placed in multiple locations along the X-polarization within the Rx DSP 650. For example, the Rx Pulse-shape filter 729-0 can be placed prior to the CDEQ 712-1-19 and after the demultiplexer to 711-1. In some examples, the Rx Pulse-shape filter 729-0 can be placed after the CDEQ circuit 712-1-19 and prior to the PMDEQ circuit 725-10. In some examples, the Rx Pulse-shape filter 729-0 can be placed prior to the IFFT 730-19-1 and after the PMDEQ circuit 725-19. In some examples, the Rx Pulse-shape filter 729-0 can be placed prior to the clock phase detector 713 and after the CDEQ circuit 712-19. Other DSP architectures are also possible.

In some examples, each of the X polarization and Y-polarization lines can include an Rx Pulse-shape filter circuit. Specifically, as illustrated in Rx DSP 650, each of the polarization lines prior to the symbol to bits 745-0-1 to 745-19-1 and 745-0-1 to 745-19-2 can include an Rx Pulse-shape filter circuit. In this manner, each of the received subcarriers or pulses can be spectrally shaped by the functions of the Rx Pulse-shape filter circuit.

In some implementations, the Rx Pulse-shape filter circuit can be utilized in the Rx DSP 650 in order to alleviate the effects of the channel. Similarly, a Tx Pulse-shape filter circuit, utilized in the Tx DSP 402, can work with the Rx Pulse-shape filter circuit, utilized in the Rx DSP 650, across a communication link 416. Specifically, in a digital subcarrier communication system, a Tx Pulse-shape filter circuit, e.g., Tx Pulse-shape Filter circuit 508-0 to 508-19 and 518-0 to 518-19 in the Tx DSP 402 shown in FIG. 5, and an Rx Pulse-shape filter circuit, e.g., Rx Pulse-shape Filter circuit 729-0 to 729-19 shown in FIG. 7, can work collectively to minimize the intersymbol interference when the digital subcarriers are transmitted between the Tx DSP 402 and the Rx DSP 650 over a communication link 416, e.g., optical fiber, wireless link, or other. For example, each of the pulse-shape filters in the Tx and Rx DSPs, e.g., along both the X-polarizations and the Y-polarizations, can include a root-raised cosine filter (RRC), a Sinc filter, and a Gaussian filter, to name some examples. In some examples, these pulse-shape filters can work in an asymmetric distribution manner.

In some implementations, when digital data are transmitted in a digital communication system, filters can be applied on the transmitted and received side to minimize unwarranted noise. For example, for a communication system with a transmission symbol rate of $f_b=1/T$, where T is the symbol duration, the frequency response of the channel satisfies the conditions set forth by equation 1 below:

$$\frac{1}{T} \sum_{n=-\infty}^{\infty} H(f + nT) = 1, \forall f \quad (1)$$

Equation 1 can represent a Nyquist free communications. Specifically, equation 1 indicates that if the pulse-shapes used at the transmitter and receiver are different shifted versions of the same shape, then the summation of these signals can result in a value of unity or one. H is the pulse shape, n is the sampling time, and f is the frequency. This value of one is indicative of ISI free communication. One such way to attempt to enforce ISI free communication is for the transmitter and the receiver to employ pulse-shaping. Specifically, for an Additive White Gaussian Noise (AWGN) channel, one such pulse-shaping technique to employ is a raised cosine (RC) filter that satisfies the above condition of equation 1. In some implementations, the frequency domain representation of the RC filter is shown by equation 2 below:

$$H_{RC}(f) = \begin{cases} 1, & 0 \le |f| \le \frac{1-\beta}{2T} \\ \frac{1}{2}\left[1 + \cos\left(\frac{\pi T}{\beta}\left[|f| - \frac{1-\beta}{2T}\right]\right)\right], & \frac{1-\beta}{2T} \le |f| \le \frac{1+\beta}{2T} \\ 0, & \text{Otherwise} \end{cases} \quad (2)$$

As shown in equation 2 above, $\beta$ is the roll-off factor and $f_b=1/T$ is the symbol-rate. The one-sided bandwidth of this filter is $$(1 + \beta) * \frac{f_b}{2}.$$

As $\beta$ can vary from 0 to 1, the two sided bandwidth of the RC filter can vary between $f_b/2$ to $f_b$. The former that occupies the minimum required bandwidth is referred to as the Nyquist pulse-shape. This Nyquist pulse-shape is a rectangular pulse-shape in the frequency domain with width $\beta=f_b$ around the origin. Equivalently, the rectangular pulse in the frequency domain can be a sinc pulse-shape in the time domain with a slow decay tails proportional to $$\frac{1}{t}$$

spanning the entire time axis t. In practice, larger roll-off factors can be used resulting in faster decay rate proportional to $$\frac{1}{t^3}$$

at the time domain at the cost of bandwidth expansion proportional to $\beta$.

In some implementations, the RRC filter can be employed at both the transmitter and receiver in a digital communication system. Specifically, the RRC filter can be defined as the following equation below:

$$H_{RRC}(f) = [H_{RC}(f)]^{1/2} \quad (3)$$

Equation 3 can be employed at both the transmitter and the receiver sides of the digital communication system to collectively implement the ISI free raised cosine filter. For example, the received filter can implement the pulse-shaping filter according to the equation below:

$$H_{Tx}(f) = H_{Rx}(f) = H_{RRC}(f) \cdot H_{Tx}(f) \quad (4)$$

In equation 4, the bandwidth of the transmitted signal is limited by a particular amount by multiplying the root-raised cosine filter at the transmitted side by the transmitted signal. For example, the bandwidth is limited by the following equation below:

$$(1+\beta) \times f_b/2 \quad (5)$$

By limiting the transmitted bandwidth, the receiver can reduce the amount of noise it receives. Specifically, $H_{Rx}(f)$ limits the bandwidth of the additive noise entering to the receiver digital signal processing circuit, e.g., Rx DSP 650. Together, the equation components of $H_{Tx}(f)$ and $H_{Rx}(f)$ can implement the RC filtering in the digital communication system that is required for ISI free communications.

In some examples, half of the root-raised cosine filtering is performed on the transmit side and half of the root-raised cosine filtering is performed on the receive side. In this manner, one or more of the side lobes of the received spectrum can be reduced as bandwidth is limited by the RRC transmit filter. This can be labeled as symmetric root-raised cosine filtering. However, the digital communication system may employ asymmetric pulse-shape filtering at both the transmitter and the receiver to improve performance characteristics of the Tx and Rx DSPs.

In some implementations, the jitter performance of clock recovery phase detector can be improved by performing asymmetric pulse-shape filtering. Specifically, the role of timing synchronization circuit in a digital subcarrier communication can include compensation for sampling mismatch and sampling frequency mismatch of the ADC with the desired ones for subsequence DSP. This can be performed, for example, at the clock phase detector 713, which adjusts the sampling of the ADCs in the Rx optics and A/D block 600. In some examples, a timing synchronization circuit can be implemented in the form of a phased-locked loop circuit with a phase detector at its core.

In some implementations, the phase detector can determine whether the sampling time or sampling rate is too fast or too slow based on the received data. In particular, the phase detector can monitor a current sampling rate or sampling time of the ADCs in the Rx optics and A/D block 600. Moreover, the phase detector can adjust the current sampling rate or sampling time if the sampling rate is too fast or too slow. Specifically, from the sampling theorem, if a sequence of symbols is up sampled with sampling frequency $f_s$ greater than baud rate $f_b$, then a pair of frequency bins that are separated by $f_b$ contain data that originates from the same data source. In this instance, an opportunity is provided to design a phase detector for the clock recovery circuit, e.g., clock phase detector 713, using the frequency components of the received signal that are separated in frequency by $f_b$.

For example, for a system in which the sampling frequency is twice the baud rate, or $f_s=2f_b$, the phase detection can be determined using the following equation:

$$PD(\tau) = \sum_{k=0}^{N-1} \text{Im}\left\{ X[k] X^*\left[k - \frac{N}{2}\right]\right\} \quad (6)$$

In equation 6, N is a total number of frequency bins. Im{ } notes the operator that takes the imaginary part of the argument. X[k] is the k-th frequency component of the received signal represented through an N point FFT circuit.

In some implementations, clock phase detector is one of the major sources of jitter in DSP circuits for digital communication systems. Specifically, when the phase error of the received signal is estimated from random modulated data at the presence of noise, this causes an estimation error. While the jitter due to random modulated data exists even when there is no noise in the transmitted signals, the additive noise can increase the overall jitter amount, and the adverse effect of jitter is more pronounced on the overall performance of the system at the presence of noise. As such, it can be desirable to have a higher signal to noise ratio (SNR) to limit the effect of noise on jitter performance of the phase detector. Jitter can represent a deviation from a true periodicity of a presumed periodic signal. Jitter can be measured in root mean square (RMS), peak-to peak displacement, and can also be measured in terms of spectral density.

In some examples, jitter period can be defined as the interval between two times of maximum effect of a signal characteristic that varies regularly with time. For example, jitter can affect carriers of signals, cause loss of transmitted data between network devices, and can affect a receivers ability to identify received signals. Jitter can include, for example, random jitter, deterministic jitter, and total jitter, to name some examples.

Moreover, jitter's effect on the performance of a digital communication system can be equivalent to existence of untracked random ISI, which can degrade the overall system's performance. In some examples, jitter effect can be more severe for systems that have larger symbol rates, larger baud rates, smaller roll-off factors in the pulse-shape filters, and or even transmissions systems that use larger size modulation formats, e.g., 64 QAM and greater. As such, one way to tailor the pulse-shaping filters in the transmitter and receiver is to improve the jitter performance of a clock phase detector at the cost of negligible loss on overall signal to noise ratio of the system. This will be further illustrated and described below with respect to FIGS. 9 and 10.

Specifically, by supplying the output of the CDEQ circuits to the clock phase detector circuit 713 prior to processing subcarrier data at the pulse shape filter 729, the clock phase detector 713 can improve its detection of a sampling rate because the output of the CDEQ circuits experiences a reduced amount of jitter. In some implementations, the asymmetric pulse-shaping ensures that the clock phase detector 713 processes one or more received subcarriers prior to the subcarriers being processed by the pulse shape filter 729. When the receiver 600 receives the subcarriers from a transmitter 400 over the optical link 416, the subcarriers have been pulse shaped according to the asymmetric pulse-shaping scheme. For example, the transmitter can pulse shape the subcarriers using root-raised cosine with a p-value of ¼. Thus, when the receiver receives these subcarriers, these received subcarriers have been pulse shaped by the transmitter less severely than the root-raised cosine with a p-value of ¾, which will be applied by the pulse shape filter circuit 729. The clock phase detector 713 can improve its detection of the sampling rate because subcarriers that have been more severely pulse shaped at the transmitter will result in increased jitter at the receiver, which reduces the effectiveness of the clock phase detector 713. As such, by reducing the intensity of the pulse shaping at the transmitter, the clock phase detector 713 can detect a sampling rate that is less affected by jitter.

In some implementations, asymmetric pulse-shaping between a transmitter and a receiver can also be beneficial in other areas. Specifically, asymmetric pulse-shaping can be beneficial in systems in which multiple digital subcarrier signals with relatively low symbols rates are stitched together to form an equivalent signal with higher symbol rates. This can include the subcarriers as illustrated in figures FIGS. 2 and 3, for example.

In such systems where the digital subcarriers are utilized to create a higher symbol rates, e.g., 40 Gbaud or higher, the Rx DSP 650 can be used to estimate the frequency offset between the transmitter oscillator, e.g., laser 530, laser 408, and the receiver oscillator, e.g., local oscillator 610, local laser 610. In these examples, the Rx DSP can estimate or determine, from the position of notches between subcarriers in the received symbols, the frequency offset between the transmitter oscillator and the receiver oscillator using a notch detection filter circuit within the pulse shape filter circuit 729. In some examples, the difficulty of notch detection can be affected or caused by the presence of AWGN noise due to different noise sources, e.g., ISI, chromatic dispersion, and other noise sources. One such factor that can help to reduce the estimation error is to include high signal power on frequency components around the notches positions or steep slopes in the upper region of the roll-off, as illustrated in the frequency domain of the digital subcarriers.

Specifically, when the upper region of the roll-off is sharper and less rounded, the notch detection circuit can improve its frequency-offset detection. A notch detection circuit, included with each pulse shape filter 729, can improve a receiver's frequency error offset detection by measuring the frequency notches or the frequency gaps between proximate subcarriers in a digital subcarrier communication system. These frequency notches or frequency gaps represent the frequency offset error estimate. Generally, in a digital subcarrier communication system, a transmitter can apply one or more pulse shaping functions to the subcarriers prior to their transmission. The pulse shaping functions can reduce one or more side lobes of a subcarrier, which ultimately softens or rounds the subcarriers edges in the frequency domain. In response to the receiver receiving the pulse shaped subcarriers, the notch filter analyzes the received subcarriers to identify whether a frequency error offset is present. However, the notch filter can generally improve its frequency error offset detection when the subcarrier's edges are sharper, i.e., the subcarrier's side lobes in the time domain are not substantially reduced. Thus, the digital subcarrier communication system can employ the asymmetric pulse shaping to improve the notch filter's detection of the frequency error offset.

Specifically, when asymmetric pulse shaping is employed, the transmitter's pulse shaping functions can spectrally shape each of the subcarriers to a lesser degree such the subcarrier's side lobes are not substantially suppressed, i.e., the subcarrier's edges in the frequency domain remain sharp. The receiver can receive these subcarriers and the notch filter can improve its detection of the frequency error offset by measuring the "notch" or region between subsequent subcarriers. In response, the receiver can apply the pulse shaping functions to a degree greater than the pulse shaping functions applied at the transmitter. As such, the resultant asymmetric pulse shaping across the transmitter and receiver ensures the notch filter can improve its frequency error offset detection.

Figure 8:
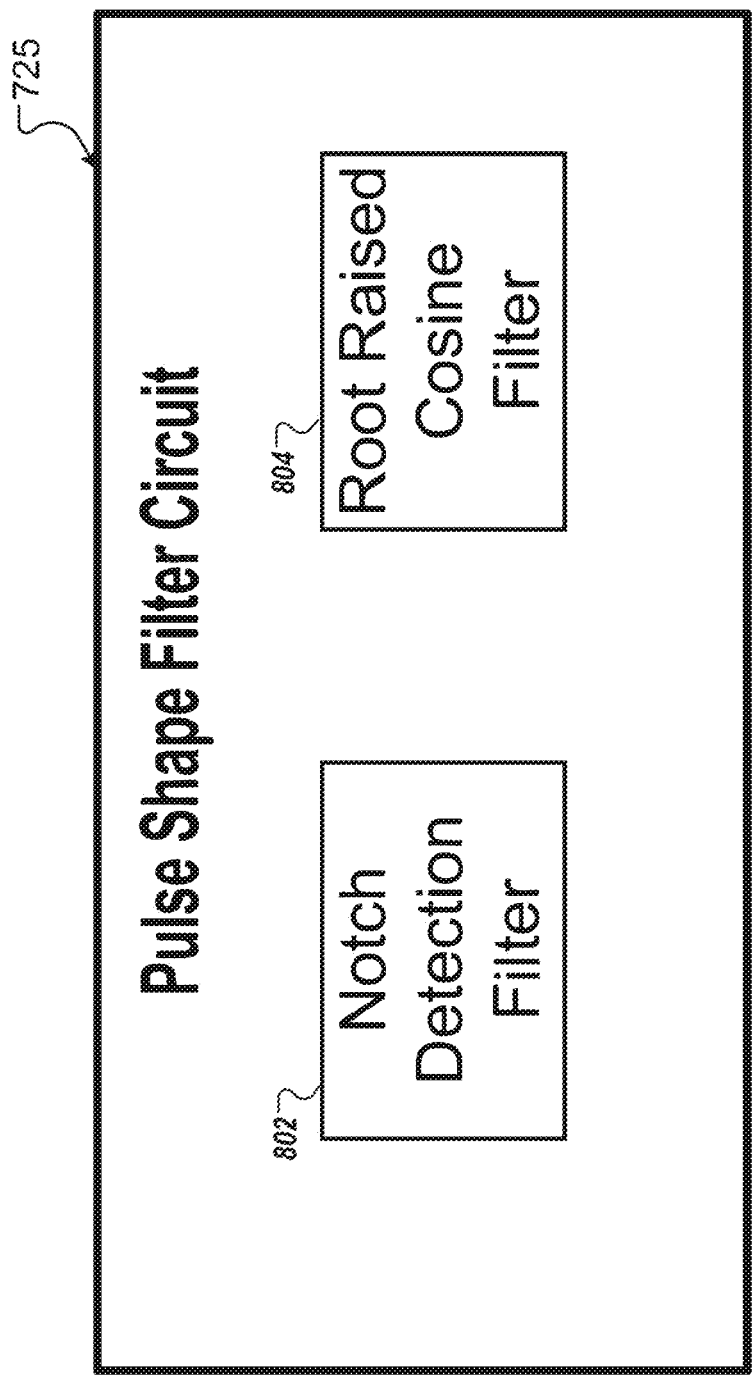
FIG. 8 is a block diagram illustrating one or more components of a pulse shape filter of the receiver shown in FIG. 7.

In this instance when the upper region of the roll-off is sharper, the notch detection circuit improves its frequency-offset detection and experiences a higher SNR in the notches between subsequent subcarriers. Thus, the notch detection circuit can detect the frequency-offset error when the notches between subsequent subcarriers have a higher SNR. In some examples, the notch detection circuit can be included in the design of the Tx and Rx pulse-shaping filter circuits. For example, as illustrated in Rx DSP 650, the pulse-shape filter 729-0 can include a notch detection filter 802 and a root-raised cosine filter 804, as illustrated in FIG. 8. Each pulse-shape filter circuit 729 can include the notch detection filter 802 and the root-raised cosine filter 804.

In some implementations, the notch detection filter can detect the frequency-offset error between subsequent subcarriers received by the Rx DSP 650. In response to detecting the frequency-offset, each of the pulse shaping filter circuits 729 can provide data to the frequency control circuitry 607 in the Rx Optics and A/D Block 600. The data can include, for example, a frequency adjustment to make to the laser 610, an instruction to adjust the frequency of the laser 610 by the frequency-offset error detection amount, and the new frequency with which the laser 610 should be adjusted. For example, the notch detection circuit of the pulse shaping filter circuit 729-0 can detect a frequency offset error of −30 MHz, indicating that the laser 610 is incorrectly tuned by 30 MHz. In this example, the laser 610 should be tuned to 700 MHz, instead of 730 MHz to which it is currently tuned. In response to the frequency control circuit 607 receiving the data for instructing the laser 610 from at least one of the pulse shape filter circuits 729, the frequency control circuit 607 can tune the laser 610 to the newly adjusted frequency. For example, the tunable frequency of the laser 610 can be adjusted to a frequency of one of the transmitted subcarriers.

In some implementations, the pulse-shape filter circuit 729 can be designed in a manner to increase the nonlinear tolerance. Moreover, a boosting scheme can be provided to improve the clock phase detector performance of the clock phase detector 713. In addition, any perturbations may be used to change the evolution of the pulse-shape filter to estimate nonlinear noise. In some examples, arbitrary pulses P (f) can be considered to be in transmission and reception. Both Nyquist ISI free communication and match filter criterions can be provided as well as the Nyquist ISI free communication criterion. More generally, any arbitrary Tx and Rx pulse-shaping filters that satisfy Nyquist criterion can be used to guarantee ISI free communications.

In some examples, asymmetric Tx and Rx filter design may include choosing the Nyquist pulse-shaping at the Tx pulse-shaping filter. An all pass filter with unit amplitude in this case can replace the Rx pulse-shaping filter. In some examples, an all pass filter with unit amplitude at the Tx filter followed by the Nyquist pulse-shaping filter at the receiver. In both of the aforementioned examples, Nyquist ISI free transmission criterion is satisfied. However, these examples may not be practical as Nyquist pulse-shaping does not include a limited bandwidth support in the time domain. As such, the noise bandwidth is not limited in the first example. In the second example, the signal bandwidth may not be limited.

In practice, RC filters with non-zero roll-off factors β are often used. This provides for clock synchronization due to non-zero excess bandwidth beyond $f_b/2$ on each side of the spectrum as previously described.

In some implementations, the jitter performance of the sample clock phase detector presented can depend on β and the excess bandwidth associated with that. In some examples, larger roll-off factors can result in larger excess bandwidth and equivalently more signal power across that region which improves the jitter performance of the clock phase detector 713. However, having larger bandwidth expansion may not be desirable in many practical and theoretical scenarios.

In some examples, the clock phase detector 713 of the clock recovery circuit can be located prior to the Rx Pulse-shaping filter 729-0. For example, the clock phase detector circuit 713 and the pulse shape filter circuit 729-19 can be connected via their inputs. Specifically, the clock phase detector circuit 713 and the pulse shape filter circuit 729-19 can both receive as input the output of the CDEQ circuitry 712-1-19. In some examples, one way to improve the signal power across the roll-off region is to design the Tx pulse-shaping filter, e.g., pulse-shape filters 508-0 to 508-19 and 518-0 to 518-19, such that the filter does not filter out the frequency component on the roll-off region of the transmitted symbols, which keeps the roll-off regions sharper. Instead, the Rx pulse-shaping filter, e.g., Rx pulse-shape filters 729-0 through 729-19, can filter out the roll-off region more severely than the Tx pulse-shaping filter. In this manner, the cascaded effect of filtering at the Tx pulse-shaping filter and subsequently filtering at the Rx pulse-shaping filter, is equivalent to a filter (such as a raised cosine filter) that satisfies the ISI free Nyquist criterion. The below equations illustrates one such exemplary design of an equivalent RC filter:

$$H_{TX}=H_{RC}^{(p)}, H_{RX}=H_{RC}^{(1-p)} \quad (7)$$

In equation 7, p represents the degree of freedom to optimize the power distribution between the Tx pulse-shaping filter and the Rx pulse-shaping filter. For example, when p=½, the result is a symmetric RRC filter system for Tx and Rx sides. In some examples, when p=¾, and the result is plugged into equation 7, the following results in asymmetric distribution. For example, the following asymmetric pulse-shaping filter distribution can be seen as follows:

$$H_{TX}=H_{RC}^{(1/4)}, H_{RX}=H_{RC}^{(3/4)} \quad (8)$$

As a result of generating the asymmetric distribution as shown in equation 8, for example, an average power improvement in dB can be seen. Specifically, an average power improvement in dB around the roll-off region with the proposed configuration of Tx pulse-shaping filter and the Rx pulse-shaping filter can be used for various values of different roll-off factors. In such cases, more than 1 dB of gain in signal power can be achieved. The table below illustrates this average power improvement in dB around the roll-off region with various p factors. The second column of the shows the percentage power penalty that may incur due to non-symmetric RRC pulse-shaping or asymmetric RRC pulse-shaping. As can be seen for small roll-off factors of β, the percentage power penalty is negligible, e.g., less than 1 dB.

TABLE 1

Power Tradeoffs For Asymmetric Pulse-shape Distribution

| β | Power ratio in roll-off region for p = ¼, and p = ½ [dB] | Percentage power penalty for p = ¼ with reference to p = ½ in dB |
|---|---|---|
| 1 | 1.0491 | 0.2732 |
| ½ | 1.0491 | 0.1366 |
| ¼ | 1.0491 | 0.0683 |
| ⅛ | 1.0491 | 0.0342 |
| 1/16 | 1.0491 | 0.0171 |
| 1/32 | 1.0491 | 0.0085 |
| 1/64 | 1.0491 | 0.0043 |

The output of each of the pulse shape filter circuits 729 is provided to polarization mode dispersion (PMD) equalizer circuit 725-0 to 725-19 (which individually or collectively can be referred to as 725). Without loss of generality, PMD equalization (PMDEQ) can be done in frequency domain or in time domain after IFFT 730 and before carrier phase correction 740.

Digital samples output from A/D circuits 640-2 associated with Y polarization components of subcarrier SC1 can be processed in a similar manner to that of digital samples output from A/D circuits 640-1 and associated with the X polarization component of each subcarrier. Namely, overlap and save buffer 705-2, FFT 710-2, demultiplexer 711-2, and CDEQ circuits 712-2-0 to 712-2-19 can have a similar structure and operate in a similar fashion as buffer 705-1, FFT 710-1, demultiplexer 711-1, and CDEQ circuits 712-1-0 to 712-1-19, respectively. For example, each of CDEQ circuits 712-2-0 to 712-19 can include an FIR filter that corrects, offsets, or reduces the effects of, or errors associated with, chromatic dispersion of the transmitted optical subcarriers. In addition, each of CDEQ circuits 712-2-0 to 712-2-19 provide an output to a corresponding one of PMDEQ 725-0 to 725-19.

As further shown in FIG. 7, the output of one of the CDEQ circuits, such as CDEQ 712-1-0 can be supplied to clock phase detector circuit 713 to determine a clock phase or clock timing associated with the received subcarriers. Such phase or timing information or data can be supplied to ADCs 640-1 and 640-2 to adjust or control the timing of the digital samples output from ADCs 640-1 and 640-2.

Each of PMDEQ circuits 725 can include another FIR filter that corrects, offsets or reduces the effects of, or errors associated with, PMD of the transmitted optical subcarriers. Each of PMDEQ circuits 725 can supply a first output to a respective one of IFFT components or circuits 730-0-1 to 730-19-1 and a second output to a respective one of IFFT components or circuits 730-0-2 to 730-19-2, each of which can convert a 256-element vector, in this example, back to the time domain as 256 samples in accordance with, for example, an inverse fast Fourier transform (IFFT).

Time domain signals or data output from IFFT 730-0-1 to 730-19-1 are supplied to a corresponding one of Xpol carrier phase correction circuits 740-0-1 to 740-19-1, which can apply carrier recovery techniques to compensate for X polarization transmitter (e.g., laser 408) and receiver (e.g., local oscillator laser 610) linewidths. In some implementations, each carrier phase correction circuit 740-0-1 to 740-19-1 can compensate or correct for frequency and/or phase differences between the X polarization of the transmit signal and the X polarization of light from the local oscillator 530 based on an output of Xpol carrier recovery circuits 740-0-1 to 740-19-1, which performs carrier recovery in connection with one of the subcarrier based on the outputs of IFFTs 730-0-1 to 730-19-1. After such X polarization carrier phase correction, the data associated with the X polarization component can be represented as symbols having the complex representation xi+j*xq in a constellation, such as a QPSK constellation or a constellation associated with another modulation formation, such as an m-quadrature amplitude modulation (QAM), m being an integer. In some implementations, the taps of the FIR filter included in one or more of PMDEQ circuits 725 can be updated based on the output of at least one of carrier phase correction circuits 740-0-1 to 740-19-01.

In a similar manner, time domain signals or data output from IFFT 730-0-2 to 730-19-2 are supplied to a corresponding one of Ypol carrier phase correction circuits 740-0-2 to 740-19-2, which can compensate or correct for Y polarization transmitter (e.g., laser 408) and receiver (e.g., local oscillator laser 610) linewidths. In some implementations, each carrier phase correction circuit 740-0-2 to 740-

19-2 also can correct or compensate for frequency and/or phase differences between the Y polarization of the transmit signal and the Y polarization of light from the local oscillator 530. After such Y polarization carrier phase correction, the data associated with the Y polarization component can be represented as symbols having the complex representation yi+j*yq in a constellation, such as a QPSK constellation or a constellation associated with another modulation formation, such as an m-quadrature amplitude modulation (QAM), m being an integer. In some implementations, the output of one of circuits 740-0-2 to 740-19-2 can be used to update the taps of the FIR filter included in one or more of PMDEQ circuits 725 instead of, or in addition to, the output of at least one of the carrier recovery circuits 740-0-1 to 740-19-1.

The equalizer, carrier recovery, and clock recovery can be further enhanced by utilizing the known (training) bits that can be included in control signals CNT, for example by providing an absolute phase reference between the transmitted and local oscillator lasers.

Each of the symbols-to-bits circuits or components 745-0-1 to 745-19-1 can receive the symbols output from a corresponding one of circuits 740-0-1 to 740-19-1 and map the symbols back to bits. For example, each of the symbol-to-bits components 745-0-1 to 745-19-1 can demap one X polarization symbol, in a QPSK or m-QAM constellation, to Z bits, where Z is an integer. For dual-polarization QPSK modulated subcarriers, Z is two. Bits output from each of component 745-0-1 to 745-19-1 are provided to a corresponding one of FEC decoder circuits 760-0 to 760-19.

Y polarization symbols are output form a respective one of circuits 740-0-2 to 740-19-2, each of which has the complex representation yi+j*yq associated with data carried by the Y polarization component. Each Y polarization, like the X polarization symbols noted above, can be provided to a corresponding one of symbols-to-bits circuits or components (demappers) 745-0-2 to 745-19-2, each of which has a similar structure and operates in a similar manner as symbols-to-bits component 745-0-1 to 745-19-1. Each of circuits 745-0-2 to 745-19-2 can provide an output to a corresponding one of FEC decoder circuits 760-0 to 760-19.

Each of FEC decoder circuits 760 can remove errors in the outputs of symbol-to-bit circuits 745 using, for example, forward error correction. Such error corrected bits, which can include user data for output, can be supplied as outputs D-0 through D-19. As noted above, in each leaf node 104a, 104b, 104c, 104d can supply or block data based on the data output at the leaf node.

Consistent with another aspect of the present disclosure, data can be blocked from output from Rx DSP 650. In one example similar to an example described above, zero (0) or other predetermined values can be stored in frequency bins associated with the blocked data, as well as the subcarrier corresponding to the blocked data. Further processing described above of such zeroes or predetermined data by circuitry in Rx DSP 650 can result in null or zero data outputs, for example, from a corresponding one of FEC decoders 760.

In another example, zeroes (0s) can be inserted in chromatic dispersion equalizer (CDEQ) circuits 712 associated with both the X and Y polarization components of each subcarrier. In particular, multiplier circuits (provided in corresponding butterfly filter circuits), like multiplier circuits M described above, can selectively multiply the inputs to the CDEQ circuit 712 by either zero or a desired coefficient. Multiplication by a zero generates a zero product. When such zero products are further processed by corresponding circuitry in DSP 650, e.g., corresponding IFFTs 730, carrier phase correction components 740, symbol-to-bits components 745, and FEC decoder 760, a corresponding output of DSP 650 will also be zero. Accordingly, data associated with a subcarrier SC received by a leaf node receiver, but not intended for output from that receiver, can be blocked.

If, on the other hand, capacity requirements change and such previously blocked data is to be output from a given leaf node receiver DSP (e.g., DSP 650), appropriately coefficients can be supplied to the multiplier circuits, such that at least some of the inputs thereto are not multiplied by zero. Upon further processing, as noted above, data associated with the inputs to the multiplier circuits and corresponding to a particular subcarrier SC is output from leaf node receiver DSP (e.g., DSP 650).

While FIG. 7 shows DSP 650 as including a particular number and arrangement of functional components, in some implementations, DSP 650 can include additional functional components, fewer functional components, different functional components, or differently arranged functional components.

Referring back to FIG. 1, in some implementations, a network node can transmit data by generating optical signals that are modulated according to one or more optical subcarriers that are associated with the intended destination or destinations of the data. For example, the hub node 102 can receive data packets (e.g., from the hub node 102 itself and/or from another network node or user device), ascertain the intended destination of each of the data packets, and identify one or more respective optical subcarriers that can be used to transmit data to each of those destinations. Based on this information, the hub node 102 can generate one or more optical signals (e.g., using one or more light emitters, such as laser emitters), modulate the optical signals according to the identified optical subcarriers (e.g., using one or more local oscillators, multiplexers, etc.), and transmit the modulated optical signals over one or more optical links to each of the intended destinations (e.g., one or more of the leaf nodes 104-104n).

The hub node 102 includes several components including a hub transceiver 112 that can generate one or more optical signals, and transmit the optical signals (e.g., via one or more egress network interfaces) to the optical communications network 108. For example, hub transceiver 112 can generate an optical signal that is modulated according to multiple sets of optical subcarriers (e.g., SC Groups 1-4), where each set of optical subcarriers is associated with a different one of the leaf nodes 104a-104n. In some implementations, the hub transceiver 112 can provide the optical signal to the splitter/combiner, which splits the optical signal into several power-divided instances of the optical signal. Each of the power-divided instances of the optical signal can be transmitted to a respective one of the leaf nodes 104a-104n (e.g., via an optical link 106).

In some implementations, at least some of the ingress network interfaces can include an Ethernet interface, an OTN interface, and/or a Serializer/Deserializer (SerDes) interface. Further, at least some of the egress network interfaces can include a SerDes interface.

Each of the leaf nodes 104a-104n can receive a respective instance of the optical signal, and selectively demodulate that instance of the optical signal according to the set of optical subcarriers to which it is assigned (e.g., to recover the data that is intended for it). Further, each of the leaf nodes 104a-104n can selectively filter, block, or otherwise not demodulate the respective optical signal according to the sets of optical subcarriers to which it is not assigned (e.g., such that it refrains from recovering the data that is not intended for it).

Figure 2:
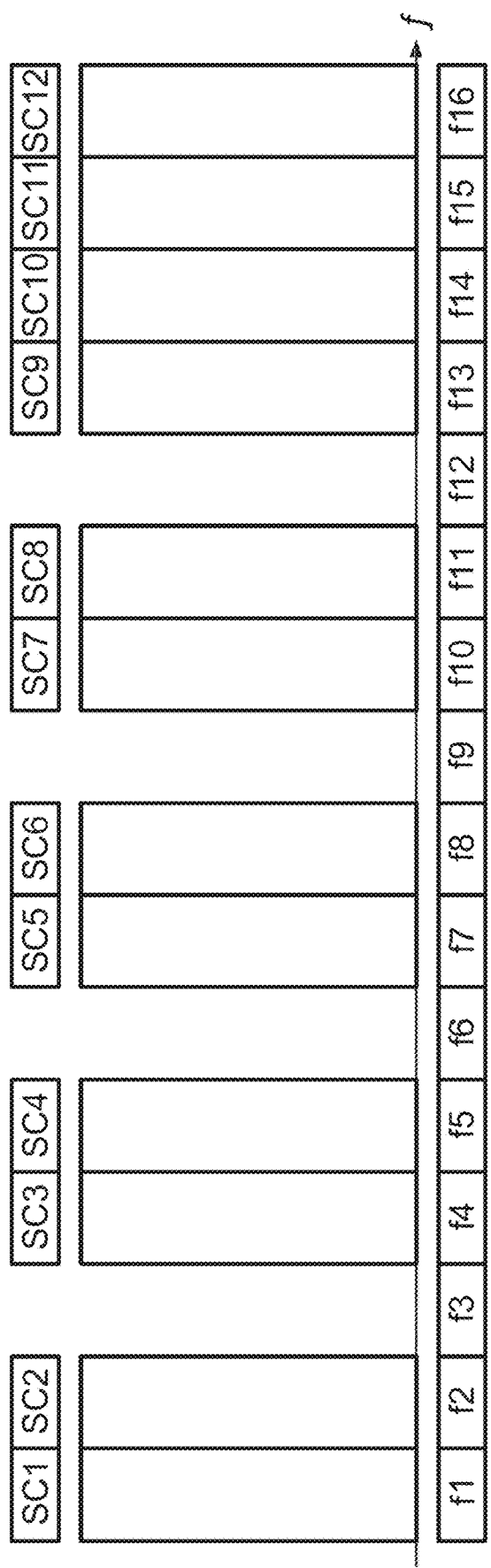
FIG. 2 is a diagram of optical subcarriers depicted over a frequency domain spectrum.

FIG. 2 shows example sets of optical subcarriers SC1-SC16 that may be made available for use by the hub node 102 and the leaf nodes 104a-104n. In this example, the optical subcarriers SC1-SC16 (corresponding to frequencies f1-f16) are available for exchanging data between the hub node 102 and the leaf nodes 104a-104n. Further, each of the optical subcarriers SC1-SC16 are spectrally contiguous with respect to the frequency domain (e.g., the frequencies f1-f16 define a continuous range of frequencies).

In an example configuration, the hub node 102 and the leaf node 104a can be assigned the optical subcarrier SC1 for exchanging data between them. Further, the hub node 102 and the leaf node 104b can be assigned the optical subcarrier SC2 for exchanging data between them. Further still, the hub node 102 and the leaf node 104c can be assigned the optical subcarrier SC3 for exchanging data between them. The other optical subcarriers can be assigned in a similar manner to facilitate the exchange of data between other pairings of the hub node 102 and the leaf nodes.

In some implementations, a single optical subcarrier can be allocated to transmit data between two respective network nodes. In some implementations, multiple optical subcarriers (e.g., two, three, four, or more) can be allocated to transmit data between two respective network nodes.

In some implementations, at least some of the subcarriers described herein can be Nyquist subcarriers. A Nyquist subcarrier is a group of optical signals, each carrying data, where (i) the spectrum of each such optical signal within the group is sufficiently non-overlapping such that the optical signals remain distinguishable from each other in the frequency domain, and (ii) such group of optical signals is generated by modulation of light from a single laser. In general, each subcarrier may have an optical spectral bandwidth that is at least equal to the Nyquist frequency, as determined by the baud rate of such subcarrier.

Although FIG. 2 shows an example configuration of twelve optical subcarriers, FIG. 2 is merely an illustrative example. In general, various number of optical subcarriers can be used by the network nodes 102 and 104a-104n to exchange data. Further, some, none, or all of optical subcarriers can be spectrally contiguous with one another with respect to the frequency domain. Further, some, none, or all of optical subcarriers can be spectrally separated from one another with respect to the frequency domain (e.g., such that one or more guard bands are positioned spectrally between adjacent optical subcarriers in the frequency domain).

In some implementations, the hub node 102 and/or the leaf nodes 104a-104n can include or be connected to pluggable devices that are configured to enhance the functionality of the network nodes 102 and 104a-104n. For example, at least some of the hub transceiver 112 and/or the leaf transceiver 114a-114n can include a physical communications interface (e.g., a plug or socket) that is configured to reversibly insert into and/or receive corresponding physical communications interface of a network node 102 or 104a-104n, and exchange information with that network node to facilitate network operations and performance.

Figure 3:
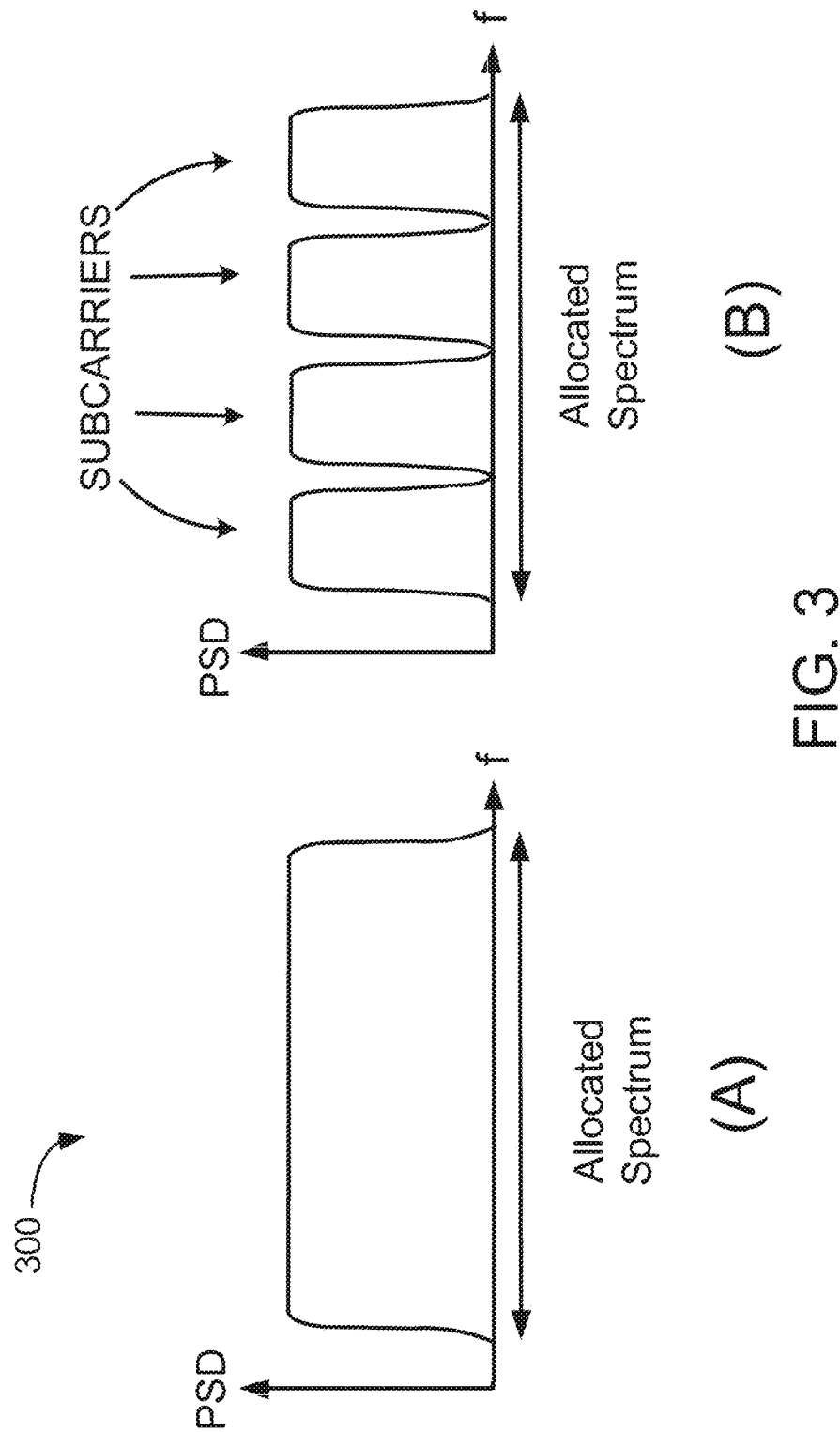
FIG. 3 is a diagram of optical subcarriers depicted over various frequency domain spectrums.

FIG. 3 is a diagram of optical subcarriers depicted over various frequency domain spectrums. In an optical communication system, a certain bandwidth, or spectrum, may be allocated to an optical communications channel. As shown in (A), the channel may include a single carrier. In the implementation of (A), data may be mapped to a pulse of a desired spectral shape. In the implementation of (A), the pulse may be designed to fill the entire spectrum.

A system and method, as described herein, may use digital-to-analog converters to generate multiple subcarriers. As shown in (B), rather than including a single carrier, the channel may include multiple subcarriers. The quantity of subcarriers may be a design decision that may be based on properties of the laser and/or other optical components being used. In the implementation of (B), data may be mapped to a respective one of the multiple subcarriers. As described in further detail below, each subcarrier may be independently generated and processed by the same transmitter.

The use of high-speed DACs and ADCs (e.g., 64 GSample/s and beyond) may reduce the computational complexity of both the transmitter and the receiver. The high speed DACs and ADCs may facilitate the tuning of the output signal given design characteristics of the lasers and the modulators, and the available power budget. According to some implementations, a transmitter may be designed with a DSP, DACs, and electro-optical conversion (e.g., a laser and a modulator), and a receiver may be designed with receiver optics (e.g., a hybrid mixer and a local oscillator), ADCs, and a DSP. Such a transmitter may generate one or more subcarriers, and such a receiver may detect the one or more subcarriers. For example, if 32 GHz of optical spectrum is available for a channel, then the transmitter might generate one subcarrier of 32 Gbaud, two subcarriers of 16 Gbaud, three subcarriers of 10.66 Gbaud, and so on. The subcarriers may be designed so that the subcarriers can be substantially encoded and decoded separately.

The use of multiple subcarriers may provide several advantages. For example, digital filters, for the multiple subcarrier approach, may include fewer taps than existing approaches. For equal dispersion, a higher baud rate requires more taps than a lower baud rate. For example, a 40 Gbaud system may need approximately 2800 baud of taps, while a 10 Gbaud system may need approximately 180 baud of taps for 200,000 picoseconds per nanometer (ps/nm). The multiple subcarrier approach may reduce the penalty due to the combination of a receiver laser linewidth and electronic dispersion compensation because of the flexibility in choosing the baud rate of the subcarriers. The multiple subcarrier approach may also permit bit error rate (BER) averaging over the subcarriers, which can lead to performance benefits. The multiple subcarrier approach may also reduce power consumption over existing approaches.

Figure 9:
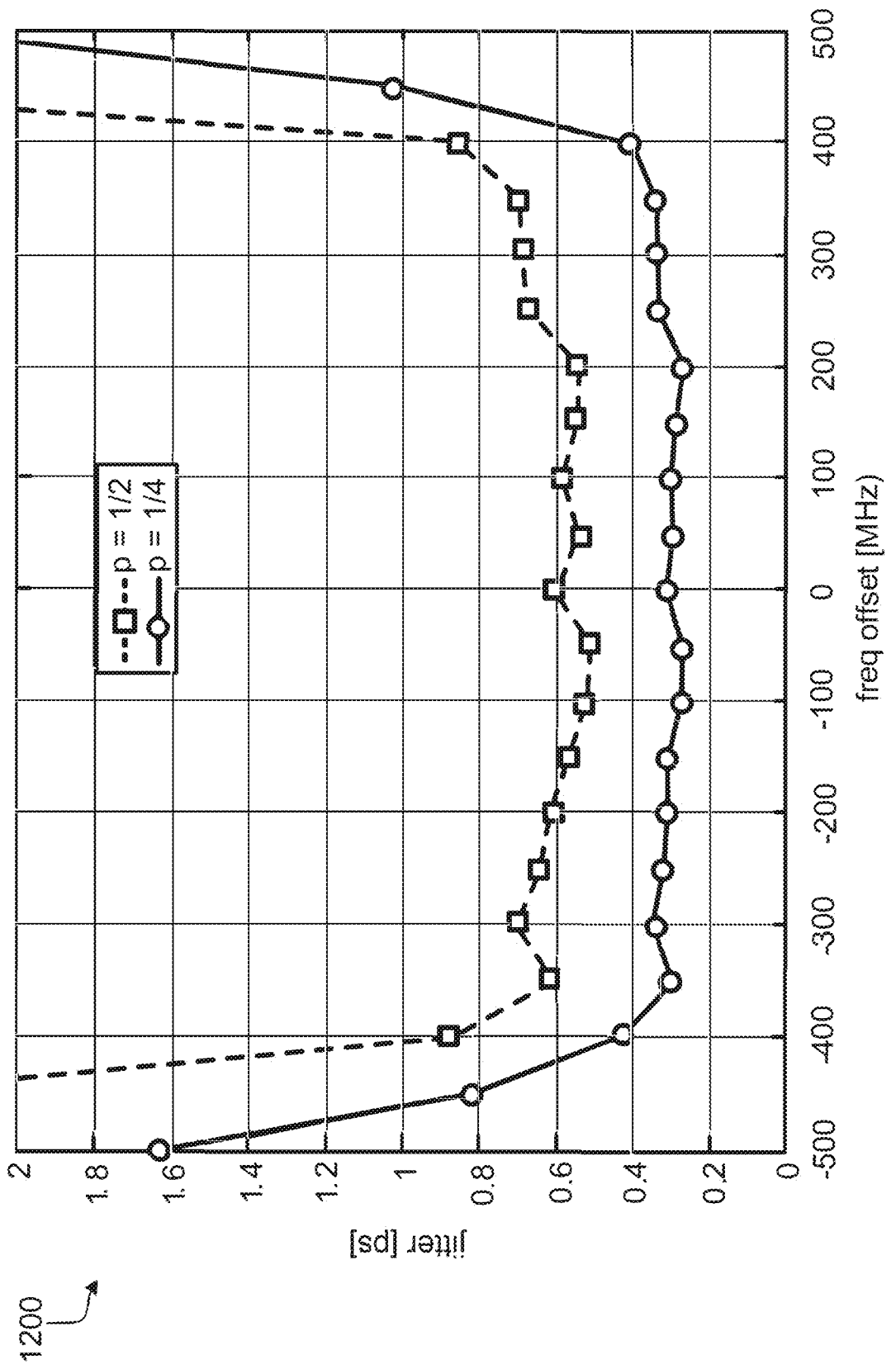
FIG. 9 is an example graph illustrating jitter versus frequency offset of a clock recovery circuit in a digital subcarrier system using asymmetric pulse-shaping filters.

FIG. 9 is an example graph 900 illustrating jitter versus frequency offset of a clock recovery circuit in a digital subcarrier system using asymmetric pulse-shaping filters. Graph 1200 illustrates the jitter versus frequency offset of a clock recovery phase detector circuit for two scenarios of Tx pulse-shaping filter and Rx pulse-shaping filter. Specifically, when p=½, symmetric distribution is employed between the Tx pulse-shaping filter and the Rx pulse-shaping filter. Moreover, when p=¼, asymmetric distribution is employed between the Tx pulse-shaping filter and the Rx pulse-shaping filter. As can be seen from the graph 900, the jitter magnitude is significantly reduced when performing the asymmetric distribution. Specifically, the jitter amount is reduced across all frequencies from −500 MHz to 500 MHz in the asymmetric distribution scheme. For example, at a 0 MHz frequency offset, the jitter amount at the receiver reduces by a value of 0.3 picoseconds. This reduction amount changes across the frequencies from −500 MHz to 500 MHz.

Figure 10:
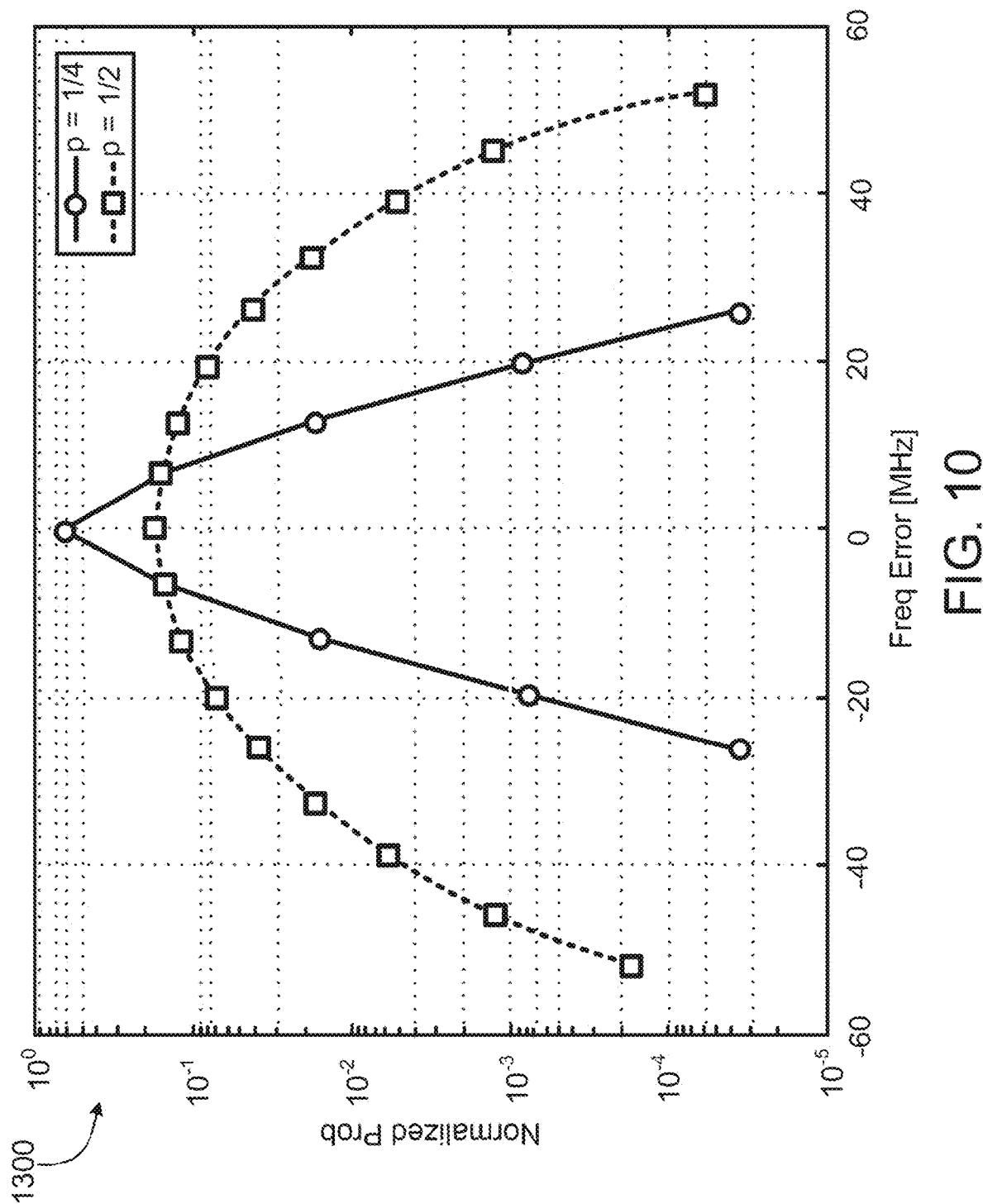
FIG. 10 is an example graph illustrating probability density function of the frequency estimating error in a digital subcarrier system using asymmetric pulse-shaping filters.

FIG. 10 is an example graph 1000 illustrating probability density function of the frequency estimating error in a digital subcarrier system using asymmetric pulse-shaping filters. Specifically, graph 1000 illustrates the probability density function of the frequency estimation error in a digital subcarrier system including 8 subcarriers. In the example of graph 1000, each of the subcarriers carries 13.5 Gigabaud signals with a roll of factor of $$\beta = \frac{1}{48}$$

at an SNR of 5.6 dB. As shown in graph 1000, the design of Tx and Rx pulse-shaping filters according to the same asymmetric principles also improves frequency offset estimation error in digital subcarrier systems through a notch detection circuit.

In some examples, the notch detection circuit can be located before the Rx pulse-shaping filter. In some examples, the notch detection circuit can be located after the Rx pulse-shaping filter. In some examples, the notch detection circuit can be located within the Rx pulse-shaping filter. Moreover, by placing the notch detection circuit prior to the Rx pulse-shaping filter, the Rx pulse-shaping filter can experience higher SNR in each frequency bin around the notch detection resulting in more accurate estimation of the notch position.

As illustrated in graph 1000, when p is set to a value of ¼, resulting in asymmetric distribution, a more accurate frequency offset estimate is measured. When p is set to a value of ½, resulting in symmetric distribution, a less accurate frequency estimate is measured. For example, the normalized probability at a frequency error of 0 MHz is closest to a probability of 1 in the asymmetric distribution as compared to the symmetric distribution.

Thus, by employing an asymmetric pulse-shaping filter design, the ISI free Nyquist criterion can be met as well as improved jitter performance and improved frequency offset detection. Moreover, the asymmetric pulse-shape filter design may filter out the frequency components around the half-baud rate frequency components, specifically, for roll-off region of RC filters. Moreover, when employing the asymmetric filter design, a power of p for the root-raised cosine filter can be designed in a manner such that the transmitter uses a value of p that is less than 1, and the receiver uses a value of 1−p for the Rx pulse-shaping filter. By implementing the asymmetric pulse-shaping distribution, the digital subcarrier communication system can (i) improve its jitter performance of the clock recovery phase detector and can (ii) improve the frequency offset estimation accuracy in the receive side.

In some implementations, the Tx pulse-shaping filter and the Rx pulse-shaping filter can be configured for asymmetric distribution. Specifically, the p value for the root raised cosine filter in the Tx pulse-shaping filter can be configured to a value that reduces the amount of filtering performed by the Tx DSP, e.g., a value of ¼, for example. The Tx DSP can spectrally shape each of the subcarriers according to the configured root raised cosine filter and transmit the corresponding spectrally shaped digital subcarriers over a communication link. The receiver can receive the transmitted digitally shaped subcarriers and the Rx DSP can process the received digitally shaped subcarriers. Specifically, the Rx DSP can process the received digitally shaped subcarriers using various processes. One of the processes can include, for example, the filtering performed by the Rx pulse-shaping filter.

The Rx pulse-shaping filter can filter each subcarrier of the received digitally shaped subcarriers using a root raised cosine filter, for example. The p value of the root raised cosine filter in the Rx pulse-shaping filter can be a value according to the asymmetric distribution scheme. For example, the p value of the root raised cosine filter in the Rx pulse-shaping filter can be a value that is determined by subtracting the p value of the root raised cosine filter in the Tx pulse-shaping filter by 1. Thus, continuing with the example, if the p value of the root raised cosine filter in the Tx pulse-shaping filter is 0.25 or ¼, then the p value of the root raised cosine filter in the RX pulse shaping filter can be determined by subtracting 0.25 from 1, resulting in a p value of 0.75 or ¾.

In this manner, the Tx pulse-shaping filter and the Rx pulse-shaping filter are said to be performing asymmetric pulse shaping distribution because of the different p values at the transmitter and receiver. The pulse shaping filters can spectrally shape each of the subcarriers according to the function being used by each of the Tx and Rx pulse-shaping filters. For example, by applying a root raised cosine filter to each of the subcarriers, ISI can be substantially reduced by ensuring the subcarriers do not blend or blur with one another. Moreover, by performing asymmetric pulse shaping distribution between the transmitter and receiver, the system can also improve its jitter performance detection and the frequency offset error estimation, as highlighted above.

While this specification contains many specific implementation details, these should not be construed as limitations on the scope of any disclosure or of what may be claimed, but rather as descriptions of features that may be specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A receiver comprising:
a detector circuit operable to receive optical signal data from an optical link; and
a filter circuit, coupled to the detector circuit, operable to (i) filter the optical signal data according to an asymmetric filtering scheme and (ii) output the filtered optical signal data, wherein the asymmetric filtering scheme comprises utilizing a shaping filter with first criteria, the first criteria including one or more values greater than one or more values of second criteria utilized by a shaping filter at a transmitter, the transmitter communicating with the receiver.

2. The receiver of claim 1, wherein the filter circuit is configured to jointly perform the filtering with the transmitter that transmitted the optical signal data over the optical link.

3. The receiver of claim 1, wherein the filter circuit comprises at least one of the root-raised cosine filter, a Gaussian filter, and a sinc filter.

4. The receiver of claim 1, further comprising:
a clock phase detector circuit coupled to the filter circuit, the clock phase detector circuit operable to (i) determine a clock timing associated with the optical signal data and (ii) adjust a sampling time of one or more analog-to-digital converters in the receiver according to the determined clock timing.

5. The receiver of claim 4, wherein the clock phase detector circuit is coupled to an input of the filter circuit and is located prior to the filter circuit in the receiver.

6. The receiver of claim 1, wherein the first criteria includes a p-value, and the p-value is a degree of freedom of the shaping filter at the receiver, and the p-value is selected to optimize a power distribution between the shaping filter at the receiver and the shaping filter used at the transmitter.

7. The receiver of claim 1, wherein the filter circuit comprises a notch detector circuit, and the notch detector circuit is operable to detect a frequency offset associated with the filtered optical signal data.

8. The receiver of claim 1, wherein the optical signal data comprises a plurality of subcarriers and a bandwidth of the plurality of subcarriers corresponds to a bandwidth of the optical link.

9. A receiver comprising:
a detector circuit operable to receive optical signal data over an optical link; and
a filter circuit operable to filter the optical signal data according to an asymmetric filtering scheme, wherein the filter circuit comprises a notch detector circuit and the notch detector circuit is configured to:
detect a frequency offset associated with the filtered optical signal data; and
adjust a frequency of an oscillator in the receiver according to the detected frequency offset.

10. The receiver of claim 9, further comprising:
a clock phase detector circuit coupled to the filter circuit, the clock phase detector circuit operable to (i) determine a clock timing associated with the optical signal data and (ii) adjust a sampling time of one or more analog-to-digital converters in the receiver according to the determined clock timing.

11. The receiver of claim 10, wherein the clock phase detector circuit is coupled to an input of the filter circuit and is located prior to the filter circuit in the receiver.

12. The receiver of claim 9, wherein the filter circuit is configured to jointly perform the filtering with a transmitter that transmitted the optical signal data over the optical link.

13. The receiver of claim 9, wherein the asymmetric filtering scheme comprises utilizing a shaping filter with first criteria, the first criteria including one or more values greater than one or more values of second criteria utilized by a shaping filter at a transmitter, the transmitter communicating with the receiver.

14. The receiver of claim 13, wherein the first criteria includes a p-value, and the p-value is a degree of freedom of the shaping filter at the receiver, and the p-value is selected to optimize a power distribution between the shaping filter at the receiver and the shaping filter used at the transmitter, the receiver configured to communicate with the transmitter.

15. The receiver of claim 9, wherein the shaping filter comprises at least one of a root-raised cosine filter, a Gaussian filter, and a sinc filter.

16. A system comprising:
a device for communicating with one or more other devices using subcarrier signals, the device comprising:
one or more filter circuits configured to (i) filter data indicative of each subcarrier signal of the subcarrier signals according to an asymmetric filtering scheme, the asymmetric filtering scheme implemented based on a degree of freedom value, and (ii) output the filtered data indicative of the subcarrier signal.

17. The system of claim 16, wherein the asymmetric filtering scheme comprises utilizing a shaping filter with first criteria, the first criteria including one or more values greater than one or more values of second criteria utilized by a shaping filter at another device, the other device communicates with the device.

18. The system of claim 16, wherein the asymmetric filtering scheme comprises utilizing a shaping filter with first criteria, the first criteria including one or more values less than one or more values of second criteria utilized by a shaping filter at another device, the other device communicates with the device.

19. The system of claim 16, wherein the filter circuit comprises at least one of the root-raised cosine filter, a Gaussian filter, and a sinc filter.

20. The system of claim 16, wherein the filter circuit is configured to jointly perform the filtering with the one or more other devices using the asymmetric filtering scheme over an optical link.

* * * * *